(12) United States Patent
Menefee et al.

(10) Patent No.: US 9,705,381 B2
(45) Date of Patent: Jul. 11, 2017

(54) ELECTRICAL GENERATOR CAPABLE OF INDOOR OPERATION

(71) Applicants: Julious M. Menefee, Novelty, OH (US); Bruce Bechhold, Chagrin Falls, OH (US)

(72) Inventors: Julious M. Menefee, Novelty, OH (US); Bruce Bechhold, Chagrin Falls, OH (US)

(73) Assignee: Origin, LLC, Novelty, OH (US)

(*) Notice: Subject to any disclaimer, the term of this patent is extended or adjusted under 35 U.S.C. 154(b) by 0 days.

(21) Appl. No.: 14/848,727

(22) Filed: Sep. 9, 2015

(65) Prior Publication Data

US 2016/0072364 A1  Mar. 10, 2016

Related U.S. Application Data

(60) Provisional application No. 62/047,737, filed on Sep. 9, 2014.

(51) Int. Cl.
| | |
|---|---|
| *F01N 3/00* | (2006.01) |
| *H02K 7/18* | (2006.01) |
| *F02B 63/04* | (2006.01) |
| *H02K 9/19* | (2006.01) |
| *F01P 11/12* | (2006.01) |

(52) U.S. Cl.
CPC ............ *H02K 7/1815* (2013.01); *F01P 11/12* (2013.01); *F02B 63/04* (2013.01); *H02K 9/19* (2013.01); *F01P 2060/16* (2013.01)

(58) Field of Classification Search
USPC .......... 60/274, 287, 292, 298, 320, 323, 324
See application file for complete search history.

(56) References Cited

U.S. PATENT DOCUMENTS

| 9,328,632 B2* | 5/2016 | Nagai ................... F01K 23/10 |
| 2007/0163932 A1* | 7/2007 | Gianfranco ............ B01D 61/10 |
| | | 210/137 |
| 2008/0022708 A1* | 1/2008 | Cho ........................ F25B 13/00 |
| | | 62/238.7 |
| 2009/0071156 A1* | 3/2009 | Nishikawa .............. F01K 13/02 |
| | | 60/660 |
| 2015/0089943 A1* | 4/2015 | Hussain .................... F01N 5/02 |
| | | 60/615 |

* cited by examiner

*Primary Examiner* — Binh Q Tran
(74) *Attorney, Agent, or Firm* — Roger D. Emerson; Emerson, Thomson & Bennett, LLC

(57) ABSTRACT

Provided is an electric generator which is capable of being used indoors. The electric generator employs the use of a cooling system which injects water directly into the engine through a domestic water pipe. The cooling system does not require the use of a water pump, radiator, cooling fans, alternator or any associated belts. The electric generator also employs the use of an exhaust system which allows for the passage of cooled exhaust gases and water from the engine in a safe manner without having exhaust fumes enter the home and without posing a fire hazard to the home or building structure. Further advantages of the indoor electric generator are discussed herein.

18 Claims, 25 Drawing Sheets

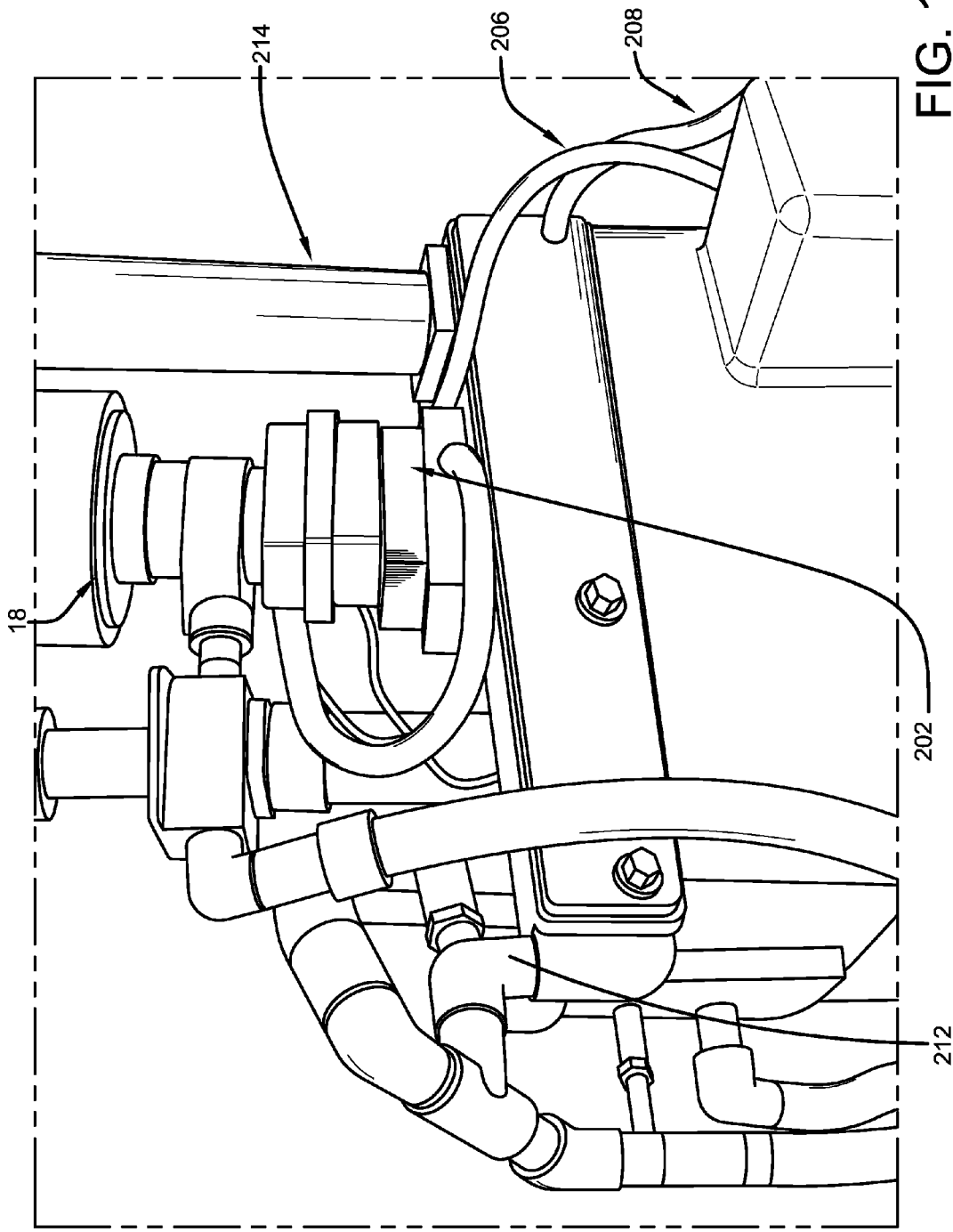

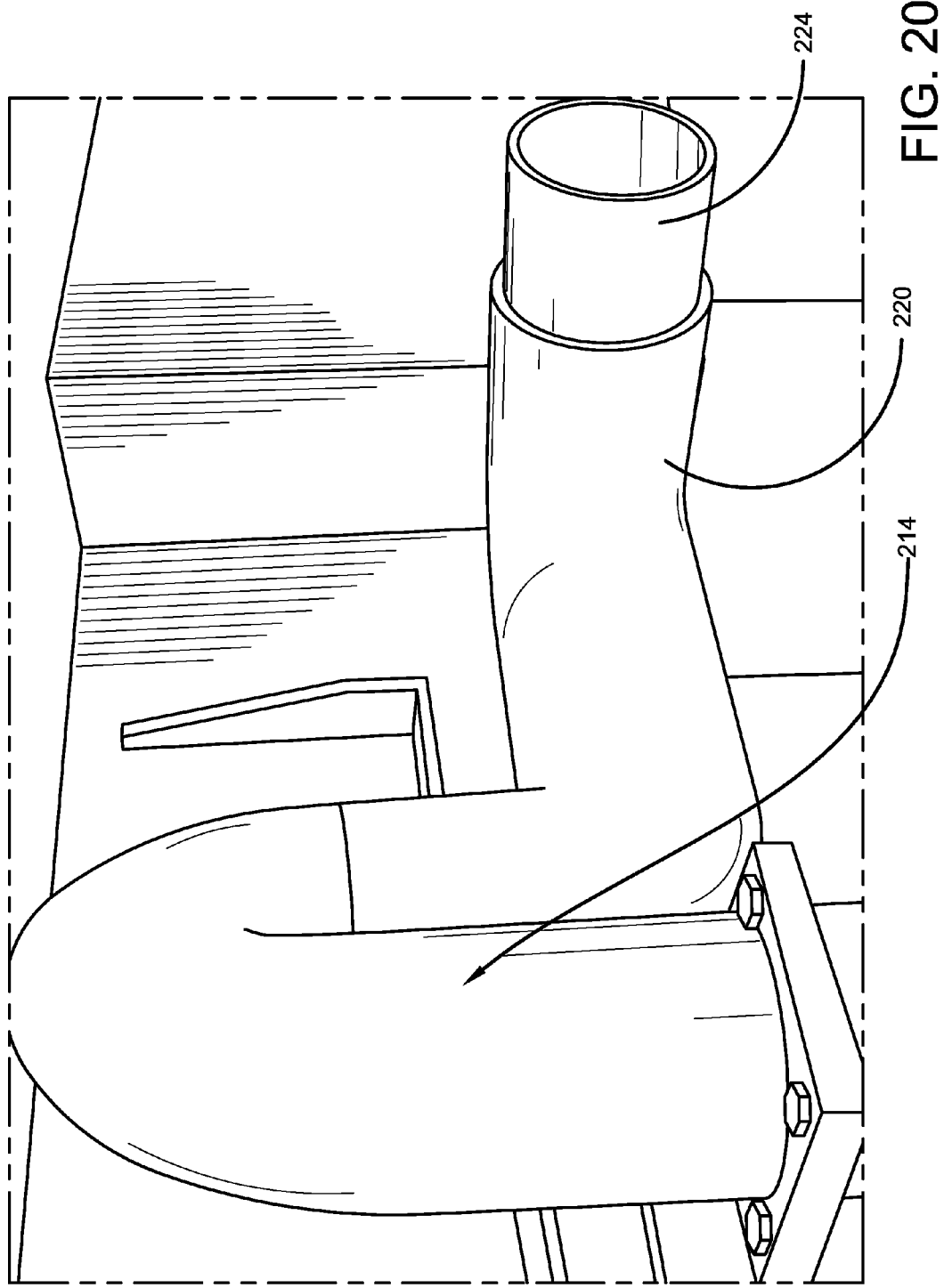

ELECTRICAL GENERATOR CAPABLE OF INDOOR OPERATION

I. BACKGROUND

A. Technical Field

Provided is an electrical generator which is capable of operating within an indoor environment or enclosed structure. Also provided is a method of operating an electrical generator within an indoor environment or enclosed structure.

B. Description of Related Art

Small scale electrical generators for residential or commercial use are well known in the art. These devices operate by utilizing an internal combustion engine to convert the energy stored in fuel (e.g., gasoline or diesel fuel) first into mechanical energy and then subsequently into electrical energy. Because these types of generators use an internal combustion engine to operate, they are often designed to operate outside so that exhaust gas does not enter the dwelling, commercial establishment or building to which power is being supplied. Utilizing generators which operate outside a home or other structure present several disadvantages. First, if one is using a mobile generator, the generator must be moved outside the building before the engine can be started. Second, generators which operate outside are exposed to the elements (e.g., rain, snow, sleet, storms, temperature variations, wind, etc.) which can cause the operating components of the generator to deteriorate faster.

Internal combustion powered generators developed for indoor operation are only available for industrial use. Currently, there are no commercially available internal combustion generators for indoor home use. Internal combustion generators typically require the use of various accessories on the engine such as an alternator, water pump, radiator and fan for operation. Utilizing such accessories on an engine places a greater load on the engine as additional energy or fuel is required to operate the accessories and to cool the engine. In addition, attaching these accessories to an engine takes up valuable space around the engine which can restrict air flow through the cabinet which is used to cool the generator's alternator. They also result in a larger sized generator taking up valuable space within the home or building structure. Including such accessories with a generator engine also increases production costs for the overall system.

In addition, the most inhibiting problem to bringing generators having an internal combustion engine into a home or other building structure is the exhaust gases that are generated. As exhaust exits the engine, they are in the range of 1,000 degrees Fahrenheit. These exhaust gases raise the temperature of a standard exhaust manifold and metal exhaust pipes to well over 500 degrees Fahrenheit. At these temperatures, touching a component of the exhaust can instantaneously result in third degree burns. Furthermore, most organic materials that come into contact with the exhaust will often burst into flames resulting in the building structure catching fire and burning down. This poses an unacceptable risk level. As a result, manufacturing generators for indoor use has typically been avoided as not a commercially viable option for most manufacturers.

Another disadvantage of bringing a generator into a home or other building structure is that generators are typically very noisy. The level of noise created by generators can be distracting and aggravating not only for the occupants of the home or building structure but also for the neighbors as they attempt to carry on with normal day to day activities.

Another difficulty with installing a generator inside a home or other building structure is that the generator must be portable and appropriately sized to fit into the space provided. One issue with regard to portability of existing generators is their weight. For example, the typical generator weighs approximately 1,200 pounds making it essentially impossible to move. Another issue with regard to portability of existing generators is their bulk and size. Moving generators down stairways, between doorways (typically 30 inches wide) and into basements can be extremely difficult, if not impossible.

In view of the problems described above, changes in indoor generators are needed to provide a generator that runs more efficiently (e.g., a generator that possesses a more efficient cooling system) and quietly. Improvements in generators are also required to provide a safe exhaust system that does not pose an injury risk to individuals, a structural risk (e.g., a fire risk) to the home or building and which can dispose of exhaust without having fumes enter the atmosphere of the home or building structure. Furthermore, a more portable generator is needed to make placement of generators within a home or building structure more practical.

What is needed is a standby generator that can solve these problems and provide a more efficient, quieter, safer and more portable system without the disadvantages of using typical cooling system and exhaust system engine components.

II. SUMMARY

Provided is a cooling system for an indoor electric generator. The cooling system may include a plumbing pipe capable of allowing tap water to be directed to a water inlet and at least one associated conduit; a pressure regulator capable of reducing the pressure of the water flow as it passes through the at least one associated conduit; an adapter plate engaged to the generator engine which is capable receiving a conduit at a main hole water entry point; a flow control valve capable of reducing the flow of water as it passes from the engine through a bypass valve on the adapter plate, wherein the cooling system does not include a water pump, a radiator, cooling fans, an alternator and associated belts.

Further provided is an exhaust system for an indoor electric generator. The exhaust system may include a wet exhaust manifold including a water inlet for receiving water from the cooling system and a water outlet, at least one exhaust gas inlet for receiving exhaust gas from a combustion chamber and an exhaust gas outlet, wherein the water outlet circumferentially surrounds the exhaust gas outlet; an exhaust riser engaged to the exhaust gas outlet and water outlet on the wet exhaust manifold, wherein the exhaust riser includes water channels circumferentially surrounding an exhaust channel to provide a cooling effect on the exhaust gases as exhaust gases and water pass through the exhaust system; at least one exhaust riser conduit engaged to the exhaust riser which allows for further passage of a mixture of exhaust gases and water through the exhaust system; a marine muffler engaged to an exhaust riser conduit which allows for separation of exhaust gases from water received from the exhaust riser and which dispenses the exhaust gases through a stack and water down a drain.

Further provided is a sound insulation system for an indoor electric generator. The sound insulation system may include a casing having a front panel, a back panel, a first side panel, a second side panel and a top panel, wherein the sound insulation system includes a sound barrier material which lines the inner surface of at least the front and back panel of the casing comprising an open cell foam layer, first a lead loaded vinyl sheet, a first foam layer, a second lead loaded vinyl sheet and a second foam layer, wherein the sound barrier material positioned on the front and back panels of the casing form a plenum respectively on the front and back panels which allows for cooling air to be drawn over the top of the generator as it operates.

Further provided is a support structure for an indoor electric generator. The support structure may include an alternator mounting rail and an engine mounting rail, wherein at least one end of the alternator mounting rail and the engine mounting rail are capable of engaging with each other; a joint capable of attaching the alternator mounting rail to the engine mounting rail at the point of engagement; and removable castor wheels on the alternator mounting rail and the engine mounting rail allowing for movement of a generator alternator and a generator engine into proper position for installation.

Other benefits and advantages of this invention will become apparent to those skilled in the art to which it pertains upon reading and understanding of the following detailed specification.

III. BRIEF DESCRIPTION OF THE DRAWINGS

The disclosed indoor electric generator and corresponding methods may take physical form in certain parts and arrangement of parts, embodiments of which will be described in detail in this specification and illustrated in the accompanying drawings which form a part hereof and wherein:

FIG. 19 is a perspective view of a non-limiting first embodiment of a wet exhaust manifold with a water entry conduit, carburetor and exhaust riser installed.

FIG. 20 is a perspective view of a non-limiting first embodiment of an exhaust riser.

FIGS. 21a, 21c, 21d, and 21e are views of a non-limiting first embodiment of an exhaust riser and gasket.

Figure 22:
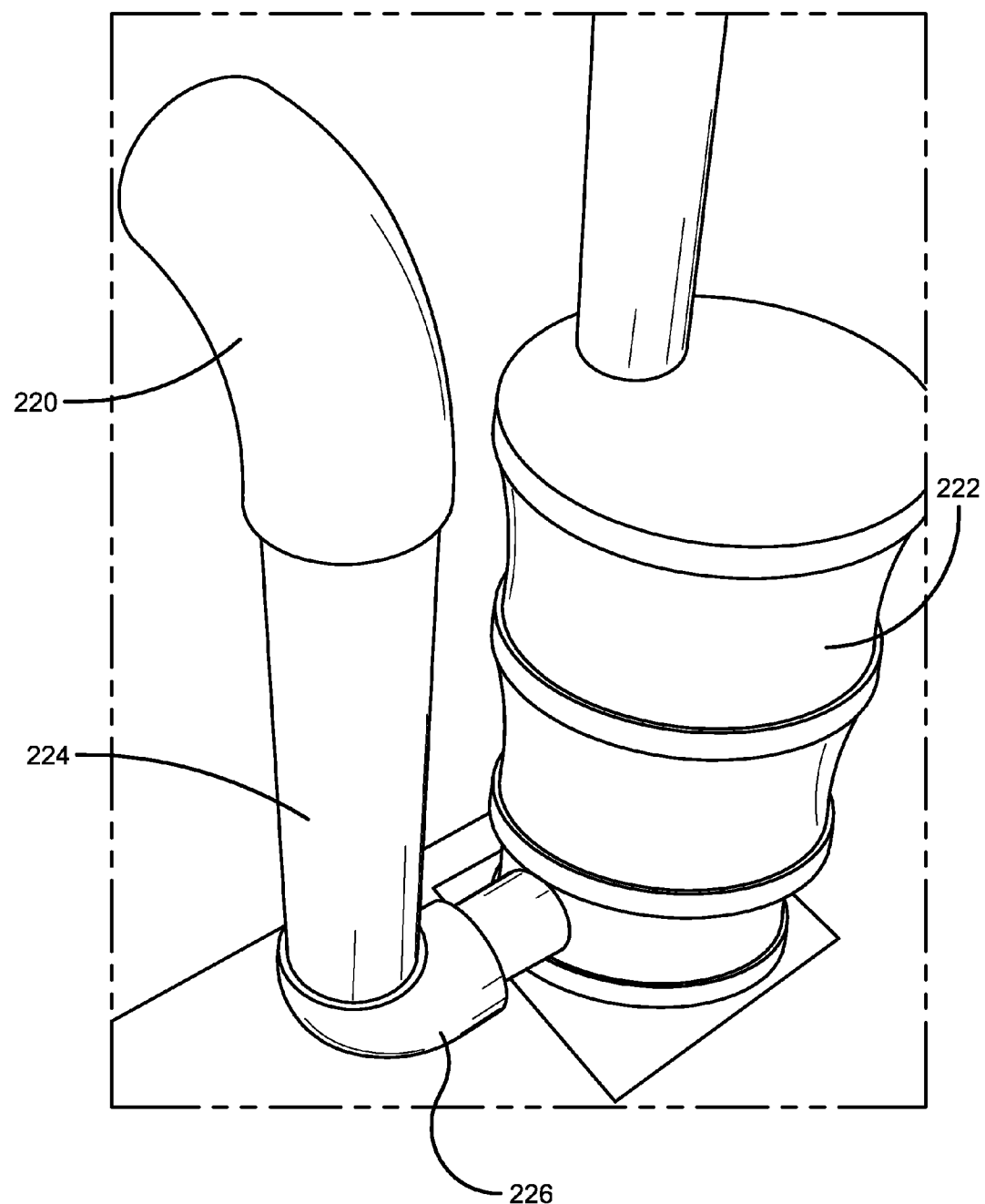

FIG. 22 is a perspective view of a portion of a non-limiting first embodiment of an exhaust system.

Figure 23:
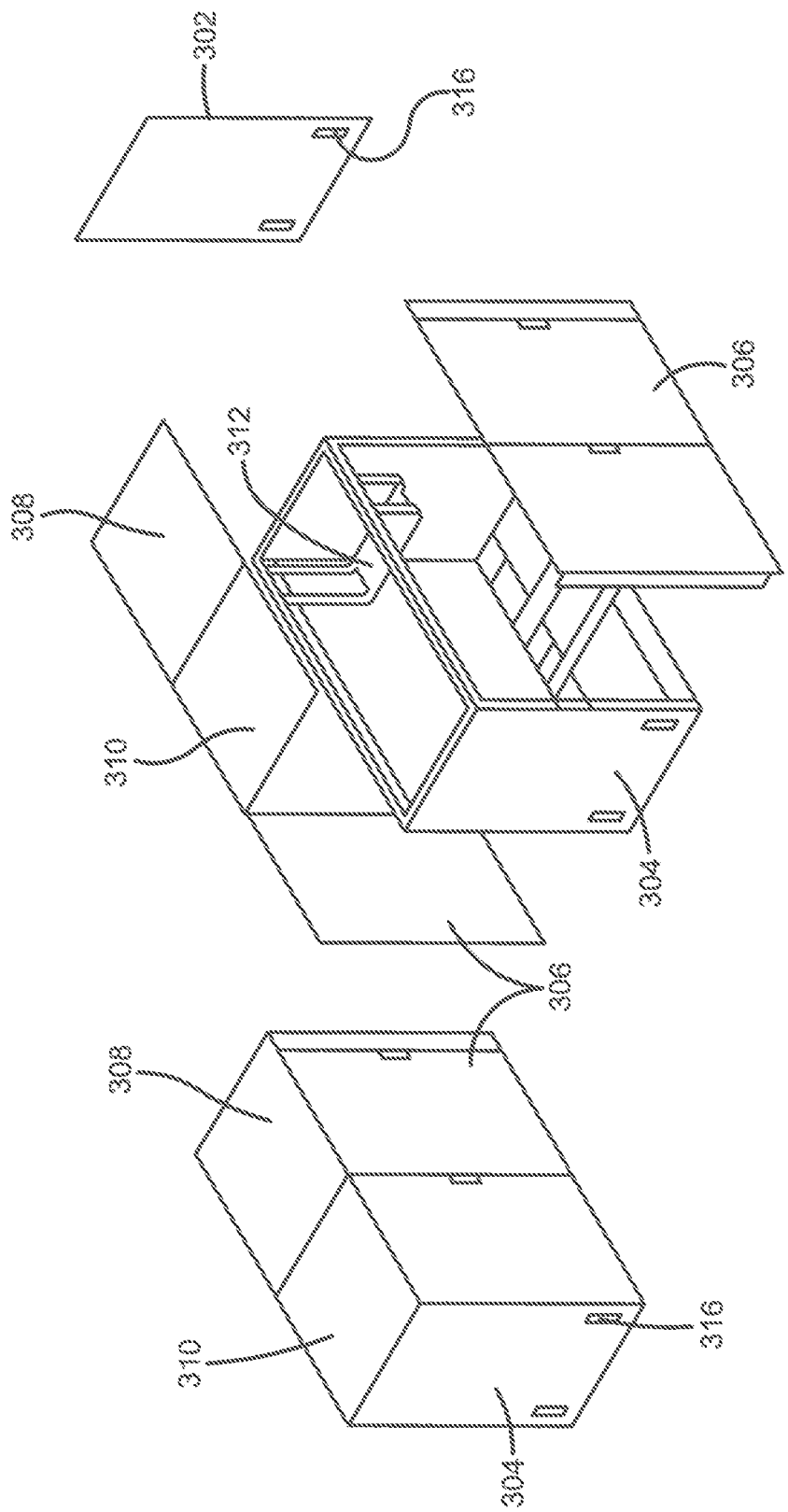

FIGS. 23a and 23b are perspective views of a non-limiting first embodiment of a casing for an electric generator.

Figure 24:
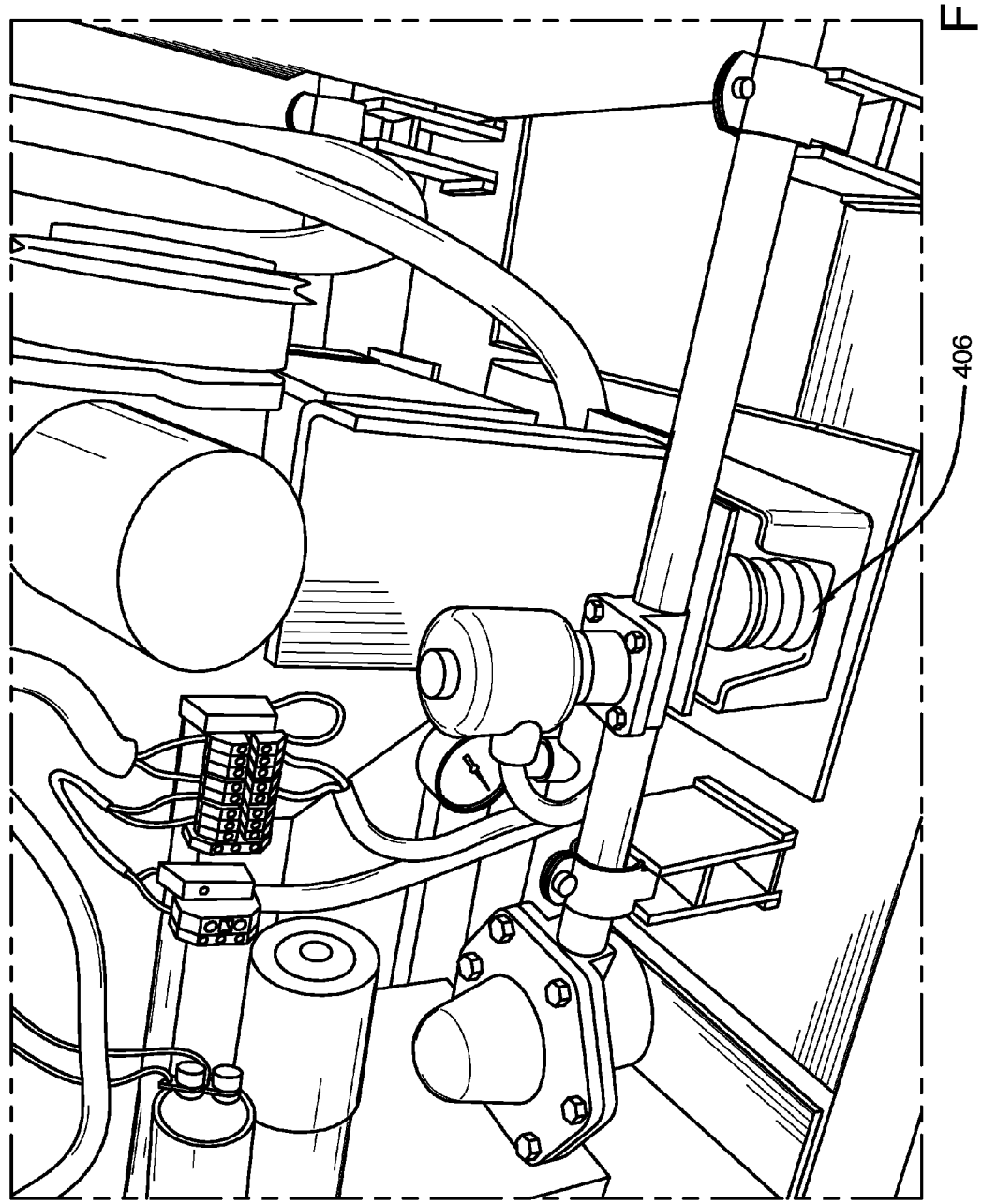

FIG. 24 is a side perspective view of a non-limiting first embodiment of a strut mount, engine rail and cooling system for an electric generator.

Figure 25:
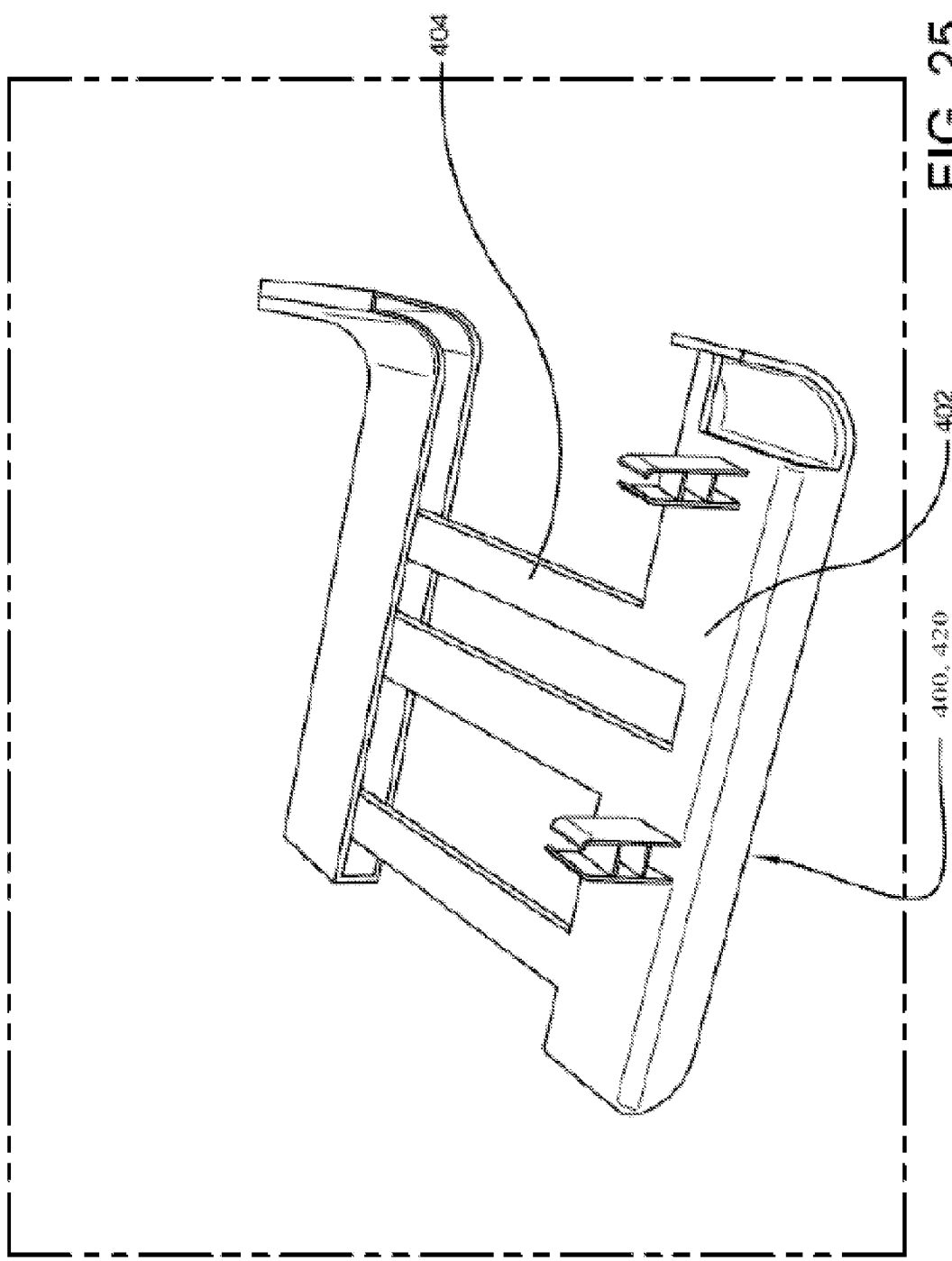

FIG. 25 is perspective view of a non-limiting first embodiment of a generator and an engine rail system for an electric generator.

IV. DETAILED DESCRIPTION

Provided is a standby electrical generator that can be installed inside a home or other building structure. The generator includes an internal combustion engine, an alternator and its associated components necessary for operation.

Provided is a generator for indoor use. The generator includes an internal combustion engine and an alternator. The generator may operate on any type of fuel including but not limited to diesel, gasoline, propane and natural gas. In certain embodiments, however, the fuel utilized to power the generator is natural gas. In operation, natural gas enters a carburetor where the appropriate air/fuel mixture is obtained and sent through the intake manifold for passage to the engine cylinders which contain the pistons. Spark plugs positioned within the cylinder head provide the source of ignition for the air/fuel mixture within the ignition chamber of each cylinder. As ignition and combustion of the air/fuel mixture occurs within the ignition chamber of each cylinder, the pistons positioned within the cylinder move in appropriately timed fashion which causes rotation of a crankshaft. The internal combustion within each cylinder and rotation of the crankshaft provides the mechanical forces necessary for the alternator to convert mechanical energy into electrical energy.

The alternator converts mechanical energy into electrical energy through the process of magnetic induction. To accomplish this, the alternator utilizes a stator and a rotor. Stators typically consist of copper coils wound within a cylindrical device within the interior of the alternator's outer casing and do not rotate with the engine. Rotors typically consist of wire coils wrapped around a metal core and are typically attached to the engine crankshaft to rotate with the engine. Rotation of the rotor within the stator creates an electromagnetic force. As the rotor spins, the rotor's electric field passes through the stator coils and generates a voltage which can be used to power various appliances within the home or building.

Figure 1:
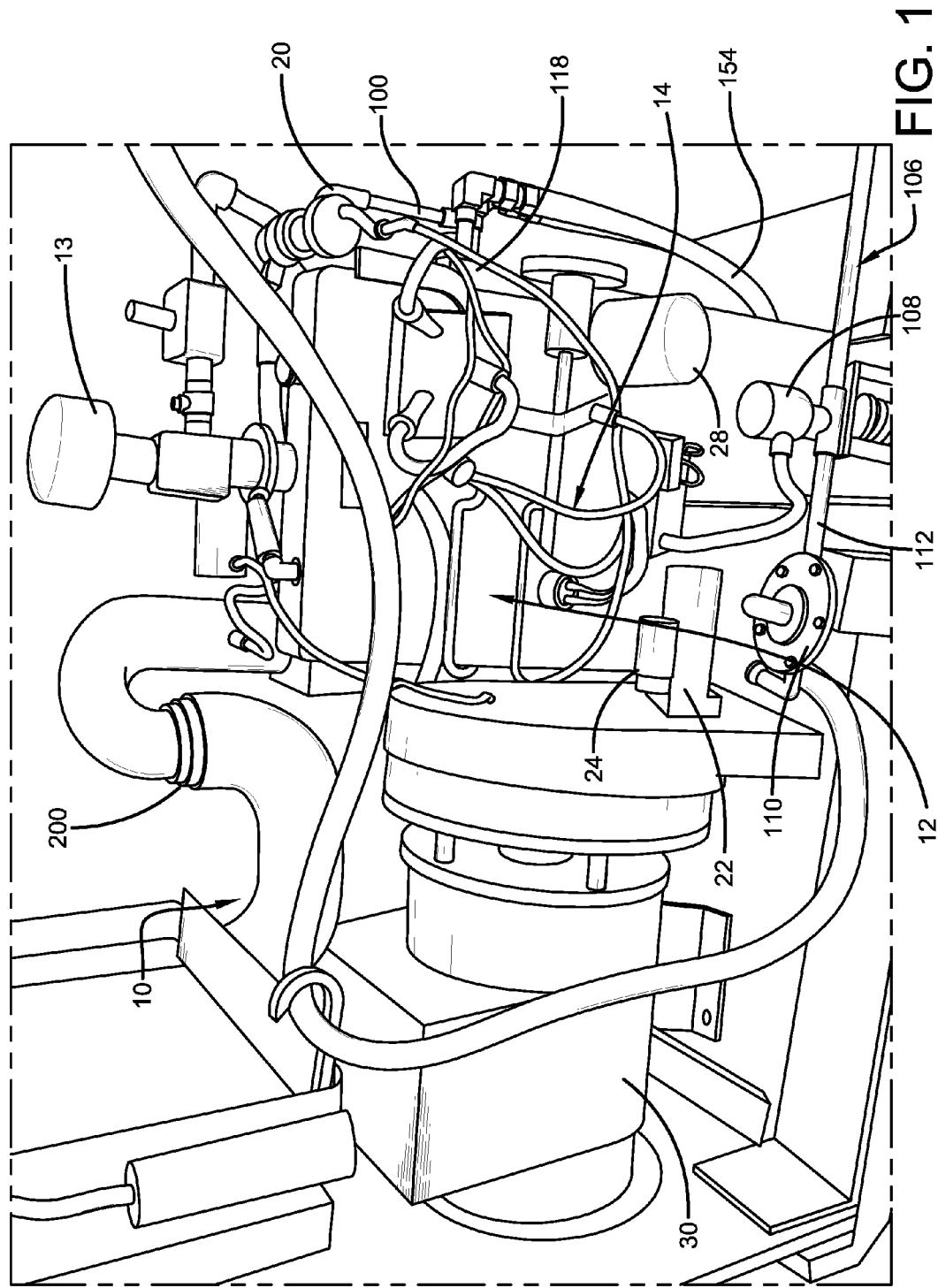
FIG. 1 is side view of a non-limiting first embodiment of an electric generator.
Figure 2:
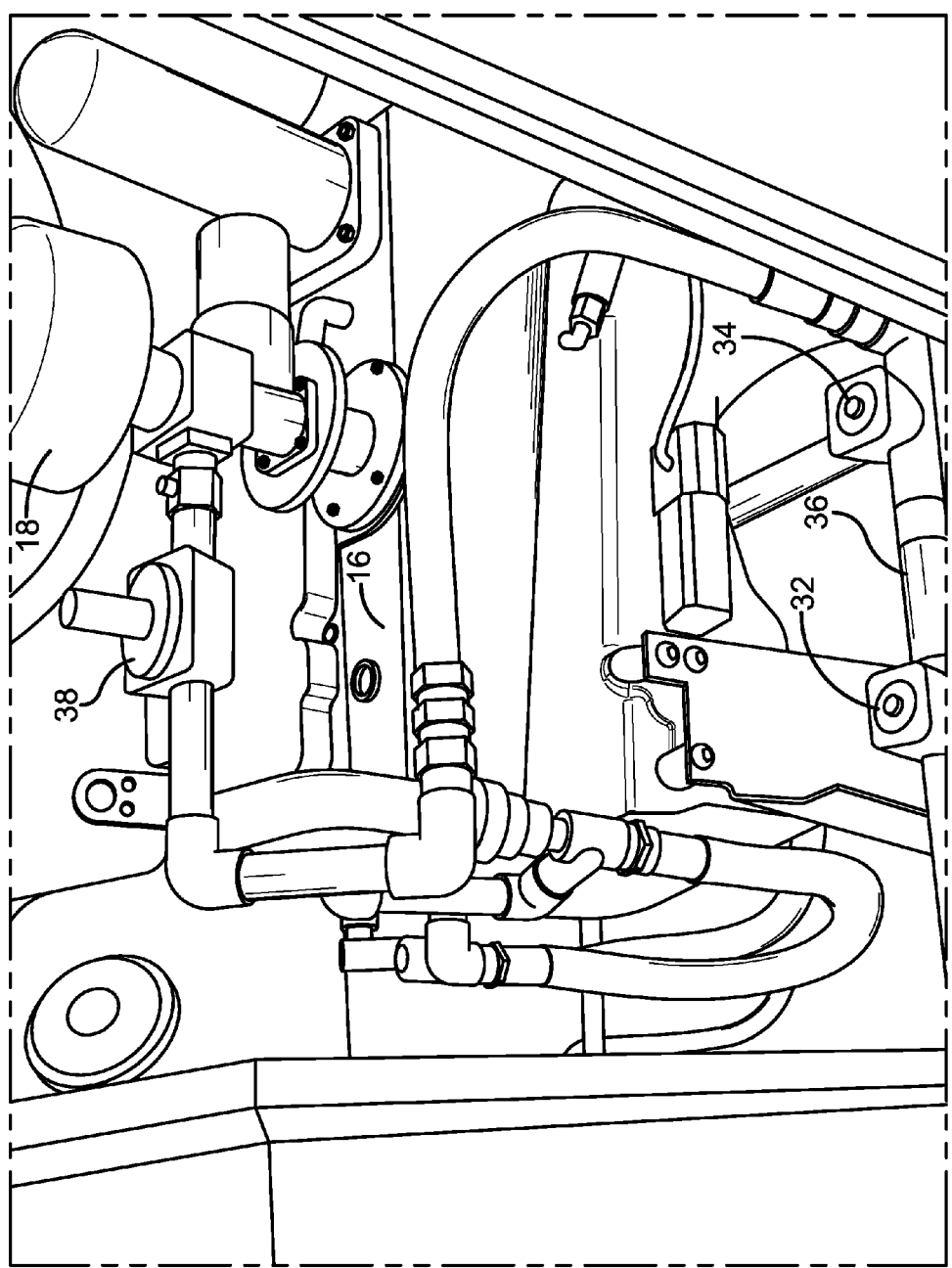
FIG. 2 is a side view of the non-limiting first embodiment of an electric generator.

Referring now to the drawings wherein the showings are for purposes of illustrating embodiments of the electrical generator only and not for purposes of limiting the same, and wherein like reference numerals are understood to refer to like components. FIGS. 1 and 2 show an exemplary generator (10) for indoor use. The generator includes an internal combustion engine (20) and an alternator (30). The generator may operate on any type of fuel including but not limited to diesel, gasoline, propane and natural gas. In certain embodiments, however, the fuel utilized to power the generator is natural gas. In certain embodiments, the fuel utilized may be propane. An exemplary engine which may be utilized with the present generator is a General Motors 3 liter, four cylinder engine, powered by natural gas and which provides approximately 45 horse power at 1,800 revolutions per minute. In certain embodiments, the electrical output of an exemplary generator may be 240/120 volts alternating current with a capacity of 30 kW. Various components of the generator (10) are illustrated within FIGS. 1 and 2. Those components include the engine block (12), spark plug wires (14), intake/exhaust manifold (16), carburetor (18), cooling system (100), exhaust system (200), starter (22), starter solenoid (24), the distributor (not shown) and the oil filter (28).

With reference to FIG. 2, the engine (20) may include two solenoids (32) and (34) on the gas line (36). These solenoids may function turn open and close a valve to control the flow of natural gas, or other fuel, to the engine (20). In certain embodiments, the second solenoid (34) may be provided as a safety precaution in case the first solenoid is inoperable. The engine (20) may also contain a governor which is capable of adjusting the fuel flow so that the generator runs continuously at a particular speed. For example, in certain embodiments, the engine (20) on the generator (10) may run continuously at approximately 1,800 revolutions per minute. The engine (20) may also include a gas pressure regulator, such as, and without limitation, a natural gas pressure regulator (38), to maintain proper pressure within the system. In certain embodiments, the pressure regulator (38) maintains a pressure of 0 PSI at no load.

Figure 6:
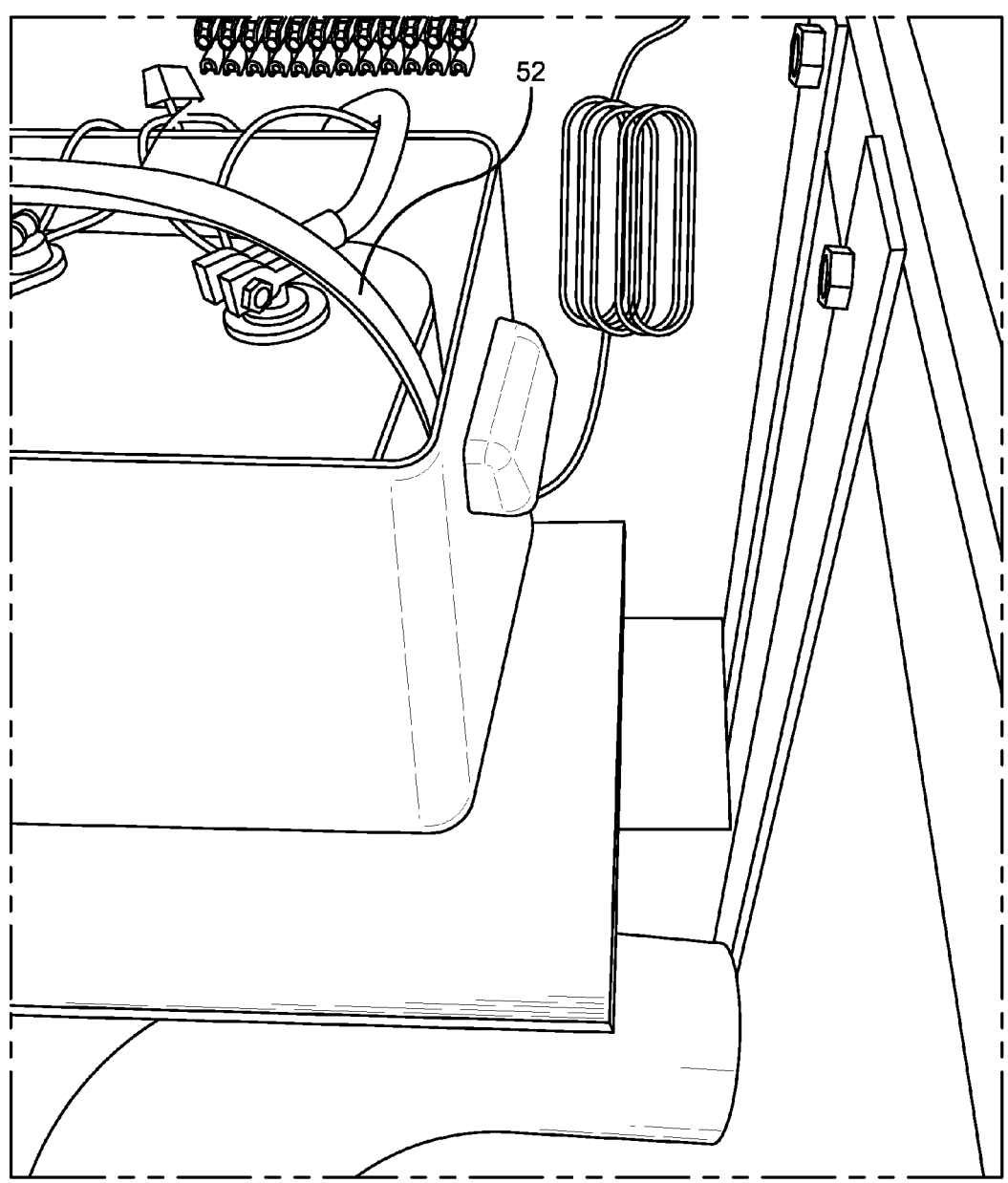
FIG. 6 is a perspective view of a non-limiting first embodiment of a battery.
Figure 7:
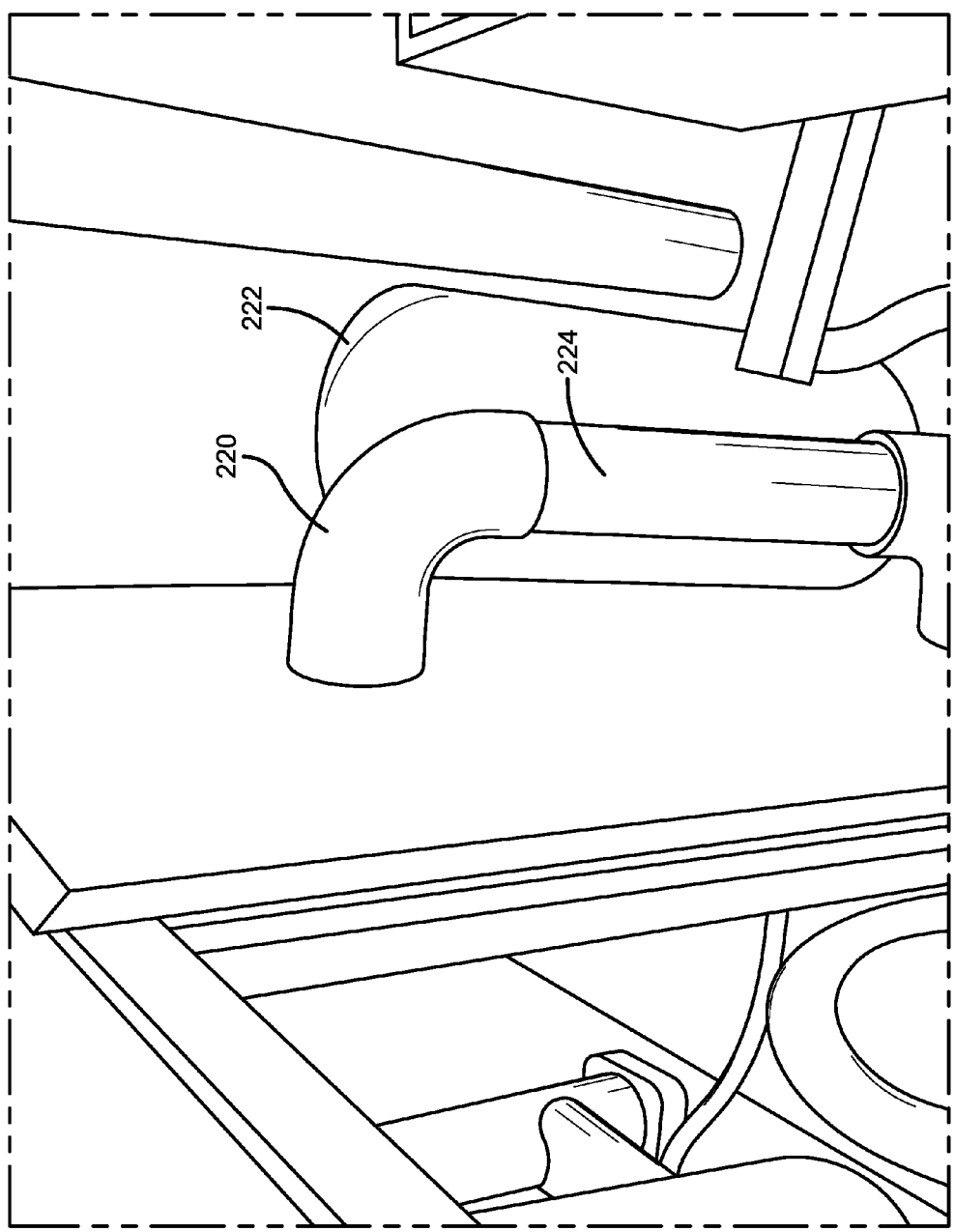
FIG. 7 is a perspective view of a non-limiting first embodiment of an exhaust system.
Figure 8:
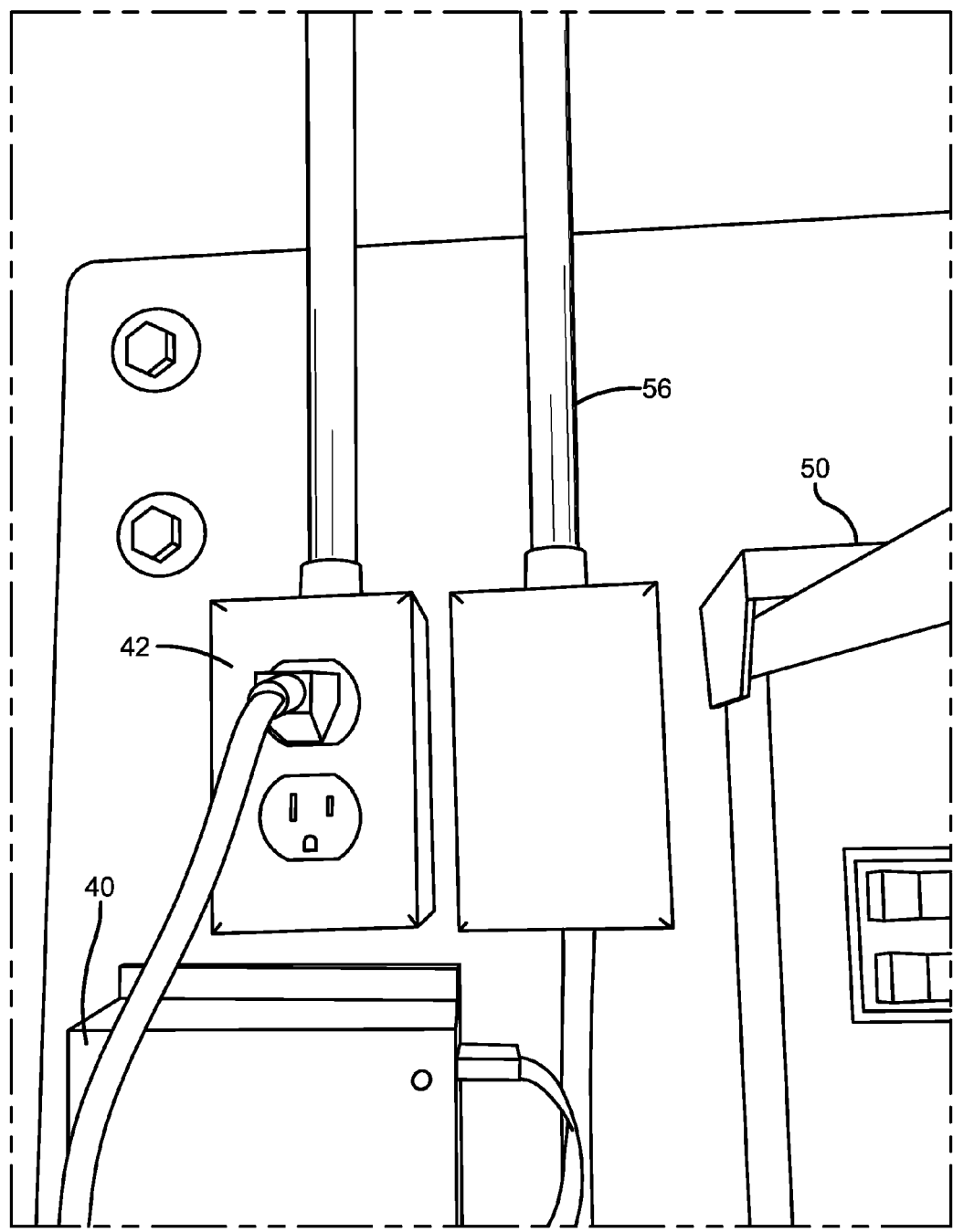
FIG. 8 is front view of a non-limiting first embodiment of a battery charger, controller circuit and switch box for an electric generator.
Figure 9:
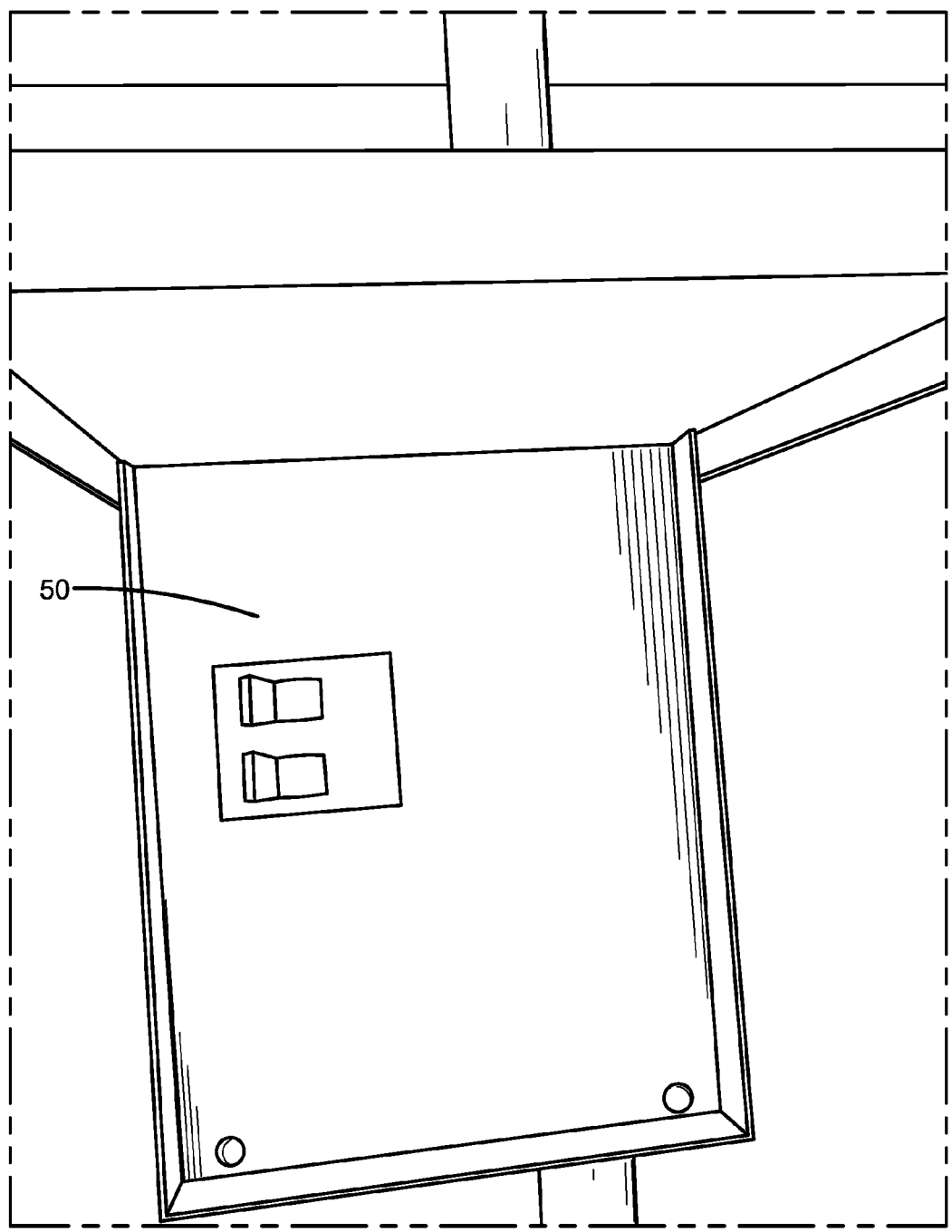
FIG. 9 is front view of a non-limiting first embodiment of a switch box for an exemplary electric generator.
Figure 10:
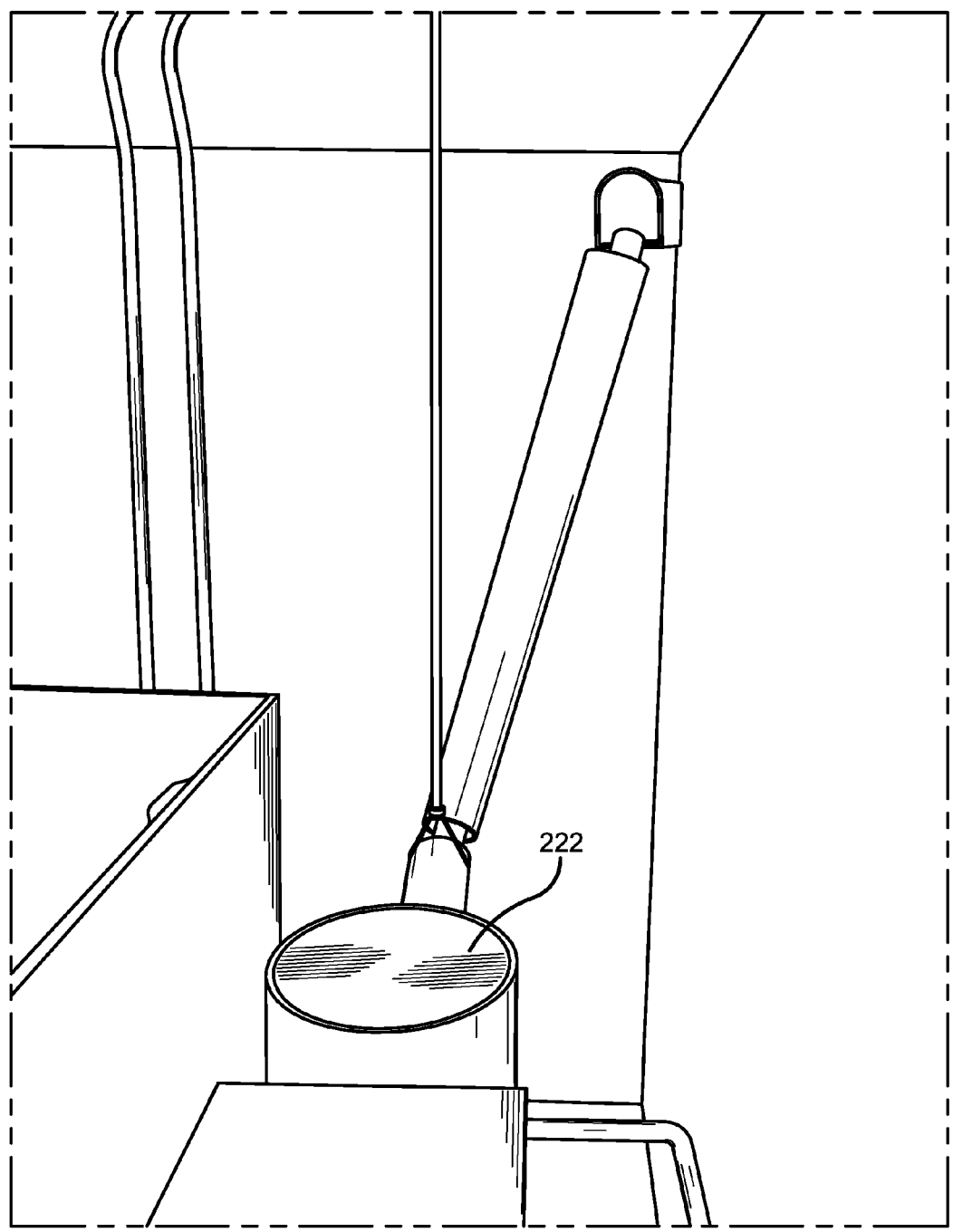
FIG. 10 is a perspective view of a portion of a non-limiting first embodiment of an exhaust system for an exemplary electric generator.
Figure 11:
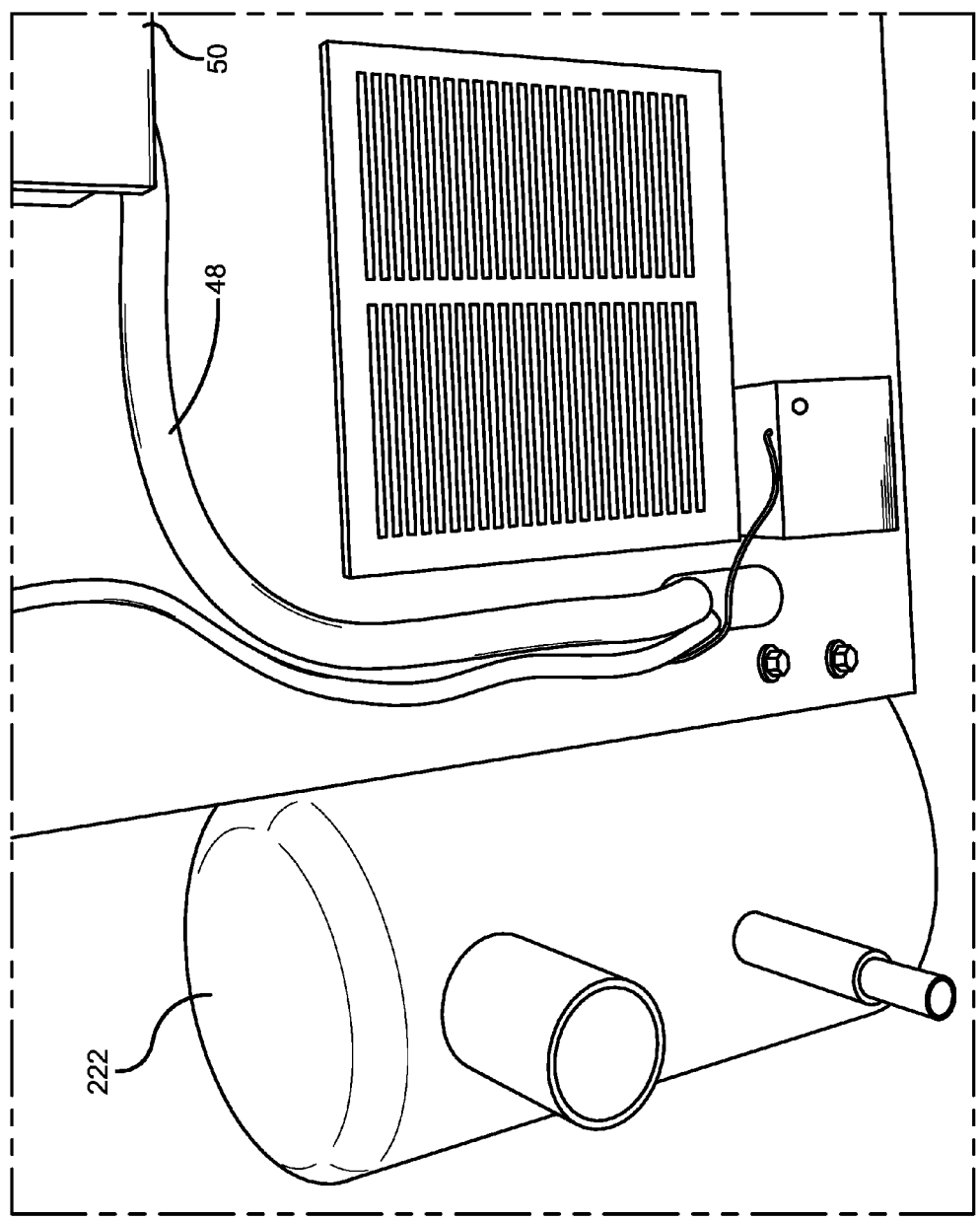
FIG. 11 is a front view of a non-limiting first embodiment of a portion of the exhaust system and the power circuit of an exemplary electric generator positioned behind a back panel.
Figure 12:
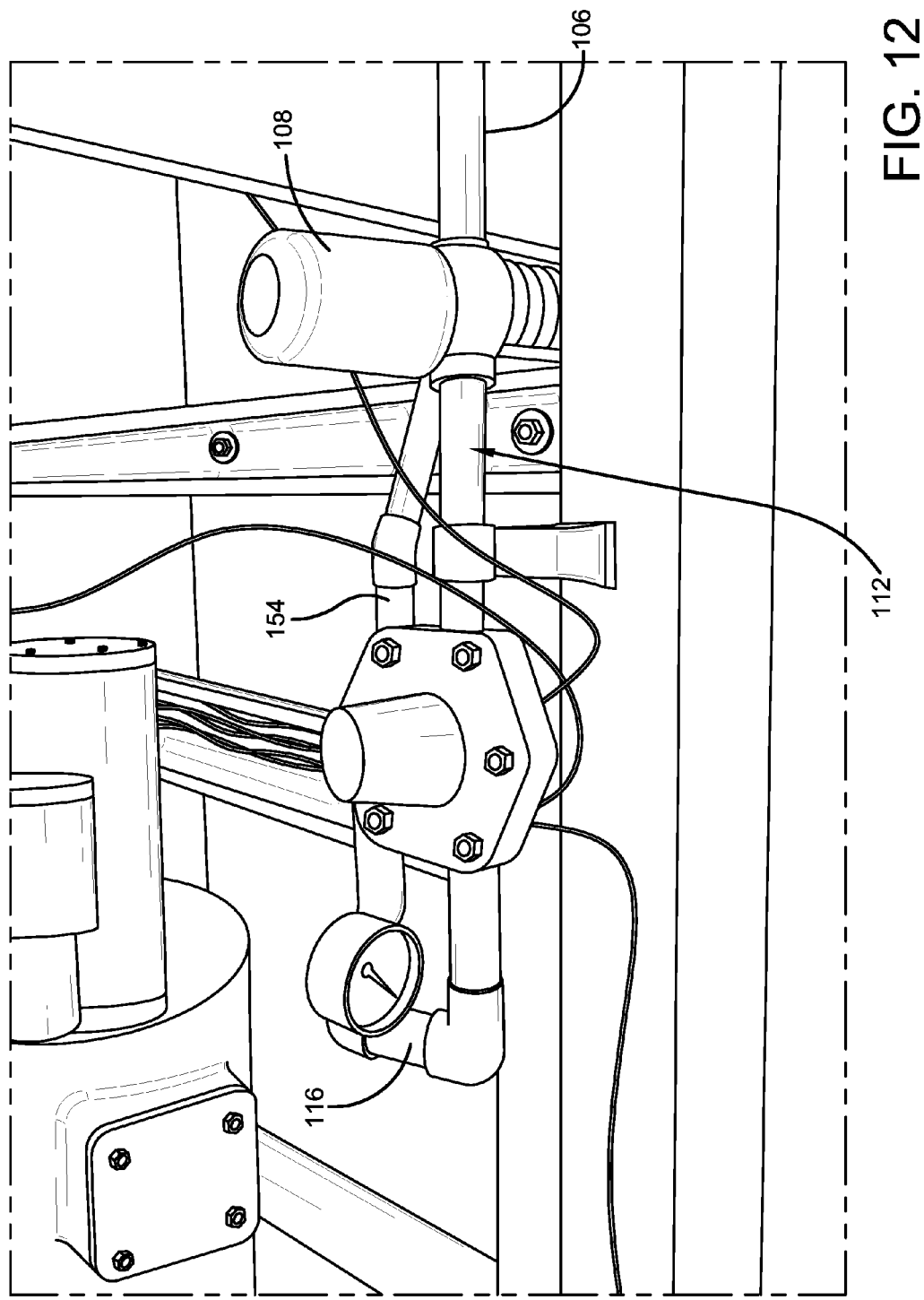
FIG. 12 is a side perspective view of a non-limiting first embodiment of a cooling system.

With reference to FIG. 6, the battery (52) provided may be a gel type electrolyte battery which does not emit hydrogen. This type of battery may function as a further safety precaution for generators which are adapted to run on natural gas. In certain embodiments, the generator (10) may include a battery charger (40) which can be plugged into an outlet (42). In certain embodiments an electrical outlet may be attached to the outer casing of, or otherwise proximate to, the generator.

With reference to FIGS. 5 and 7-9, the generator (10) may include a control unit, such as controller (44) which, in certain embodiments, may communicate between the transfer switch (not shown) via an electrical circuit (not shown). Through the transfer switch, the controller can monitor the power supply from the utility phase. For example, when the transfer switch senses a power outage from the utility phase, a circuit (56) is opened to the controller. After receiving the input from the transfer switch, the controller (44) turns on the generator. In certain embodiments, this process may take place within approximately two minutes, within approximately a minute or within a few seconds. In further embodiments, this process may take place within about 80 milliseconds, while in yet further embodiments, this process may take place within about 7 milliseconds after the power from the utility phase is cut. This process may also be reversible once the power to the utility phase returns. In such case, the controller (44) receives a signal from the transfer switch that power as returned and the controller immediately shuts the generator off (i.e. within about 7 milliseconds). This process avoids having to implement a second power failure when the power from the utility phase returns to allow time for the generator to shut off. When the generator is running, power is supplied through a circuit (48) to a switch box (50). In certain embodiments, the switch box may be a 200 ampere switch box. In other embodiments, the switch box may be a 400 ampere switch box.

The generator (10) may further include a thermostat (not shown) which senses the running temperature of the engine. If the engine begins to run too cool (e.g., at or below 40 degrees Fahrenheit) or too hot, the thermostat will send a signal to the control unit which can alert the owner via a phone call that the engine's operating temperature is approaching a danger zone. In alternative embodiments, the control unit may include a safety feature which automatically shuts the engine down under such conditions. Other components of the generator (10) will be described in greater detail below.

One of the advantageous features of the present generator (10) is the cooling system (100). The cooling system (100) employed by the generator (10) is unique in that it does not require the use of a water pump, radiator, fan and an engine alternator. It also does not require the use of coolant additives such as engine coolant or antifreeze to cool the engine. The cooling system (100) may use water, such as, and without limitation, ordinary tap water to cool and maintain the engine at normal operating temperatures.

In a typical engine containing a water pump, the water or coolant flow would come from the radiator and flow through the water pump into the engine. The water or coolant would then exit the engine through the thermostat exit and flow back into the radiator to complete the cycle. In order to replace the function of the water pump, pressurized tap water may be used to run water through passageways within the engine cooling system (100).

With reference now to the non-limiting embodiment shown in FIGS. 1, 3, 4, 12 and 13, the engine cooling system (100) may operates as follows. First tap water flows from a faucet through a plumbing pipe (102) into a water inlet (104) and passes through a first conduit (106). Water flow through the water inlet (104) and the first conduit (106) may be controlled by a solenoid (108) which receives an input from a controller (44) to open or close the flow of water depending on whether the engine is operating or not. In certain embodiments, operation of the solenoid (108) may also depend on the cooling needs of the engine. Water flow through the water inlet (104) and the first conduit (106) may also be controlled by a pressure regulator or pressure reducer valve (110). It is noted that the solenoid and the pressure regulator (110) may be positioned in any sequential order with respect to the water flow. In certain embodiments, however, the solenoid (108) is positioned before the pressure regulator (110).

Typically, water flowing through residential tap water has a pressure of about 40 pounds per square inch (PSI) and flows at a rate ranging from about 4 to about 8 gallons per minute and may reach up to about 23 gallons per minute depending on the diameter of the hose. A water pump on a vehicle typically pumps about 8 gallons per minute at idle, about 25 to about 30 gallons per minute during normal operation and may even reach up to 70 gallons per minute under certain conditions. Directly feeding tap water into an electric generator engine at a pressure of about 10 PSI and a flow rate ranging from about 4 to about 8 gallons per minute, however, can in certain cases, result in overcooling and adversely affect the operation of the engine. It can also deplete the contents of a low producing water well. This is typically due to too much volume of water being pumped into the engine by the plumbing pipe. Therefore, in certain embodiments, a pressure regulator (110) and flow control nipple (150) may be used to reduce the PSI and flow rate of water entering into the engine. In certain embodiments, the pressure regulator (110) reduces the pressure to about 10 PSI. Also, in certain embodiments, the flow rate of water running through the cooling system (100) is reduced to about 2 gallons per minute. Pressure regulators which may be employed with the electric generator (10) include Cash Valve B-Series pressure regulators manufactured by Pentair (Minneapolis, Minn.). After water passes through the pressure regulator, it continues to pass through a second conduit (112) (e.g., a pipe or hose). This second conduit may, in certain embodiments contain a pressure gauge (114) to monitor the pressure of the water flowing through the cooling system (100). After water passes through the second conduit (112), it may in certain embodiments pass through a water pressure gauge (152), a third conduit (116), and a fourth conduit (154) (e.g., a hose) which runs to a coolant adapter plate (118) on the front side of the engine (20). In other embodiments, the second conduit may run directly to the coolant adapter plate (118).

Figure 13:
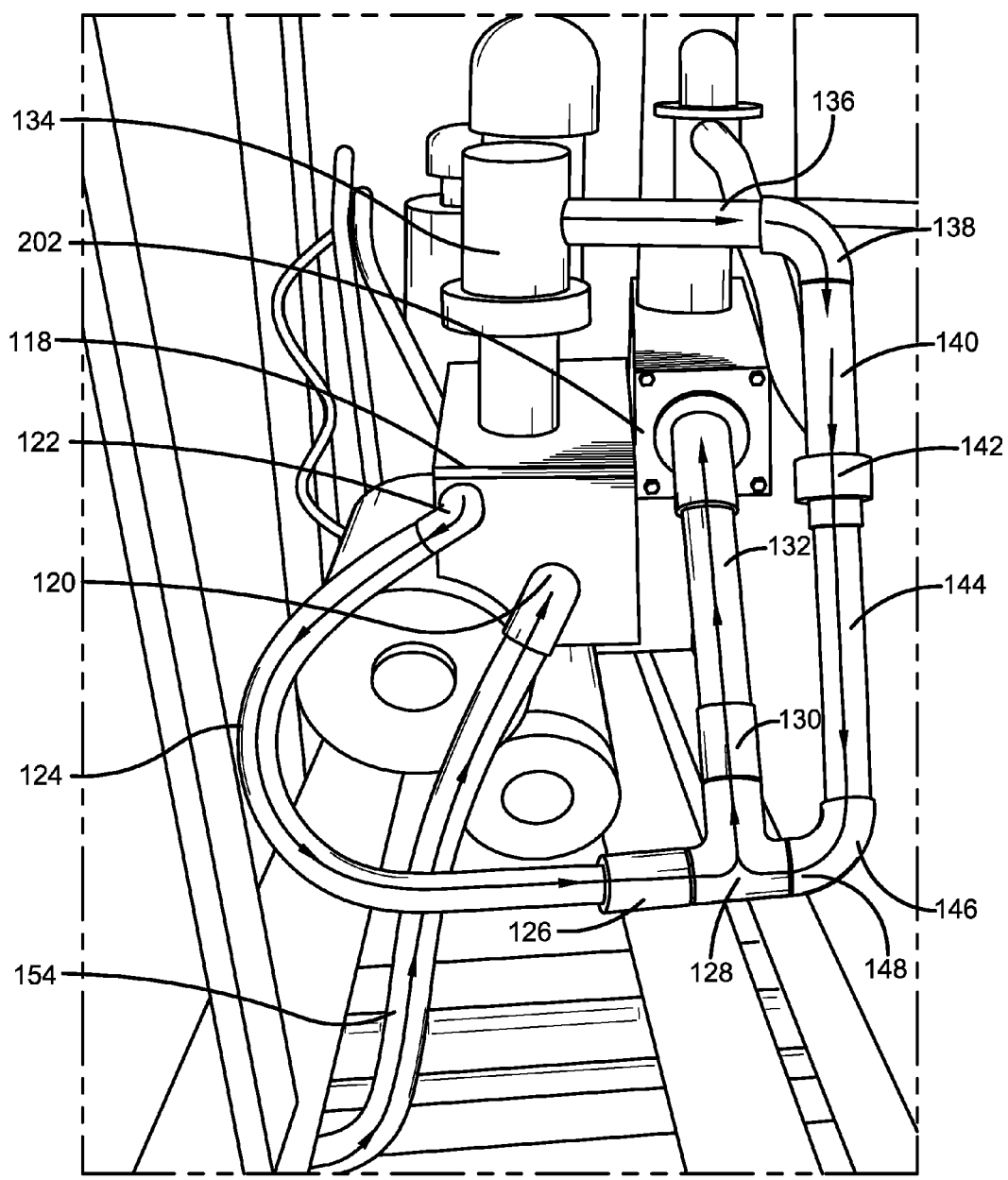
FIG. 13 is a front perspective view of a non-limiting first embodiment of a cooling system.
Figure 14:
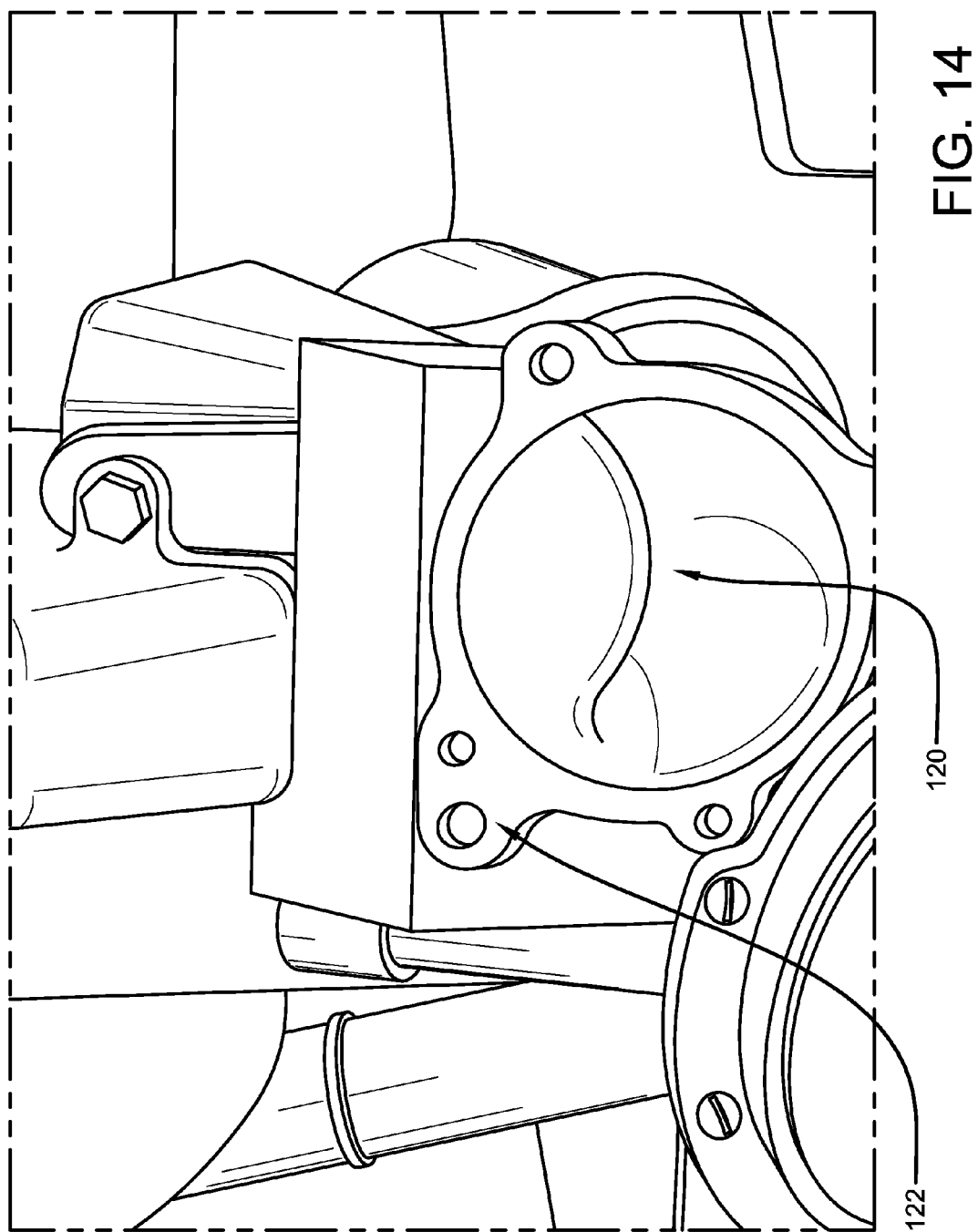
FIG. 14 is a front perspective view of a portion of a non-limiting first embodiment of a cooling system.
Figure 15:
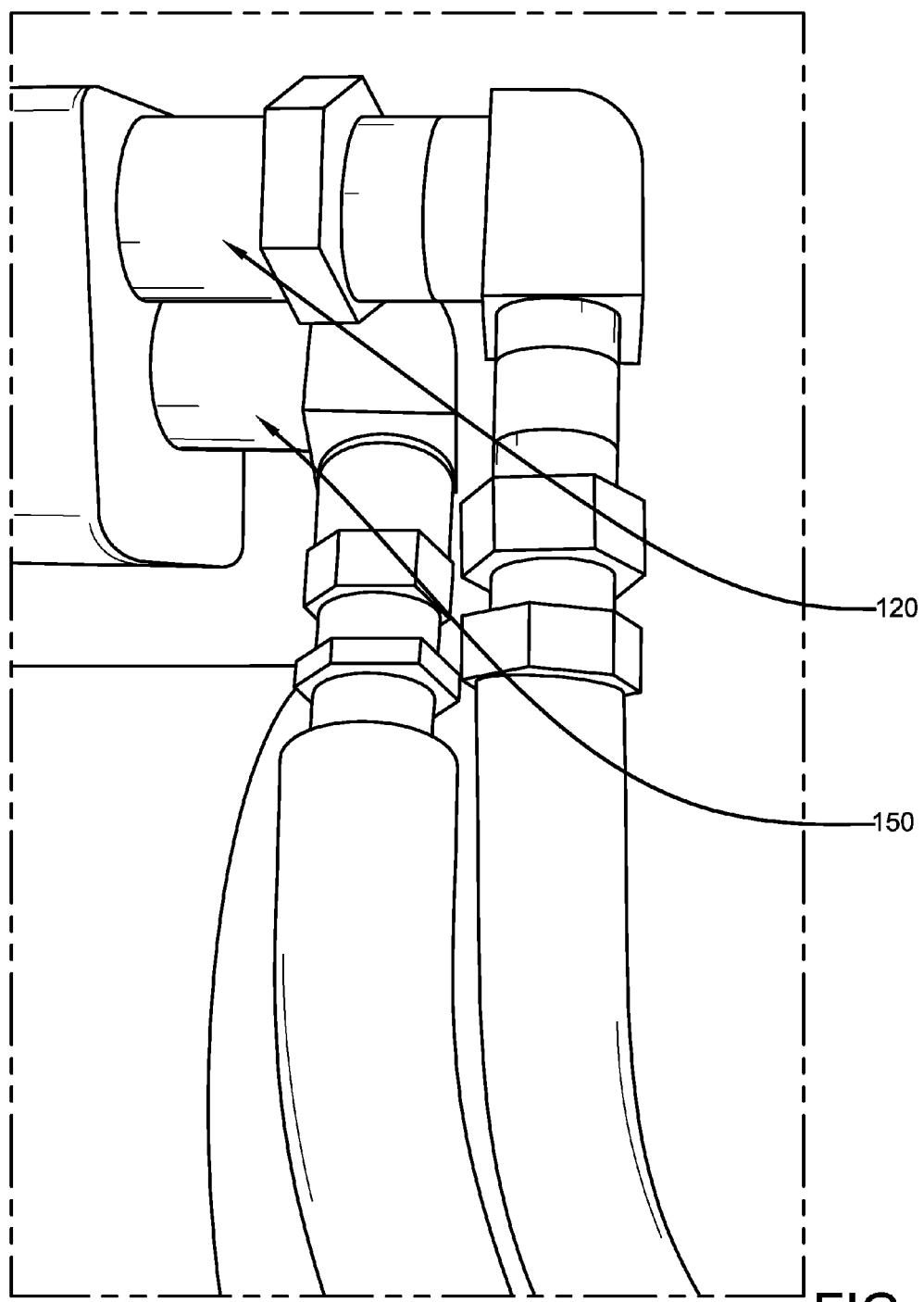
FIG. 15 is a side perspective view of a non-limiting first embodiment of a flow control valve installed onto an adapter plate and a water entry point.

With continuing reference to FIGS. 13-15, the coolant adapter plate (118) may be attached to the engine (20) in the place where a water pump is normally fitted. The coolant adapter plate (118) may, in certain embodiments, include a main hole (120) for receiving water from the second or third conduit (112 or 116) and a bypass hole (122). In certain embodiments, the main hole (120) is located within the center of the coolant adapter plate (118) and the bypass hole (122) is located in the upper left portion of the coolant adapter plate (118) when it is attached to the engine (20). Through the second or third conduit (112 or 116), water directly enters the engine through the main hole (120) within the coolant adapter plate (118) and circulates through various passageways to cool the engine. After the engine is started, water initially flows through the engine (20) and only comes out of the bypass hole (122). The bypass hole allows water to bypass the thermostat (134) and circulate through the engine (20) before water heats up to open the thermostat (134). This allows the engine (20) to cool immediately after it initially starts and before the water heats up to open the thermostat (134). As water passes through the bypass hole (122), it flows through a conduit into a wet exhaust manifold (202) to exit the engine. Any number of conduits (e.g., pipes, hoses, connectors, valves may be used) to allow water to flow from the bypass hole (122) to the wet exhaust manifold (202). In certain embodiments, water flows from the bypass hole (122) through a fifth conduit (124), a fifth conduit connector (126), a T-valve connector (128), a sixth conduit (128), a sixth conduit connector (130), a seventh conduit (132) and into a wet exhaust manifold (202) to exit the engine. Once the engine (20) comes under sufficient load to cause the water to heat to about 143 degrees Fahrenheit, the thermostat (134) opens and allows water to also flow from the engine (20) through the thermostat (134) and down into the wet exhaust manifold (202) to exit the engine. Any number of conduits (e.g., pipes, hoses, connectors, valves may be used) to allow water to flow from the thermostat (134) to the wet exhaust manifold (202). In certain embodiments, water flows from the thermostat (134) through an eighth conduit (136), an eighth conduit connector (138), a ninth conduit (140), a ninth conduit connector (142), a tenth conduit (144), a tenth conduit connector (not shown) (e.g., an elbow connector), an eleventh conduit (146) and into the T-valve connector (128), the sixth conduit (128), the sixth conduit connector (130), the seventh conduit (132) and into a wet exhaust manifold (202) to exit the engine. FIG. 13 illustrates the flow pattern of the water as it runs through the engine (20).

Figure 16:
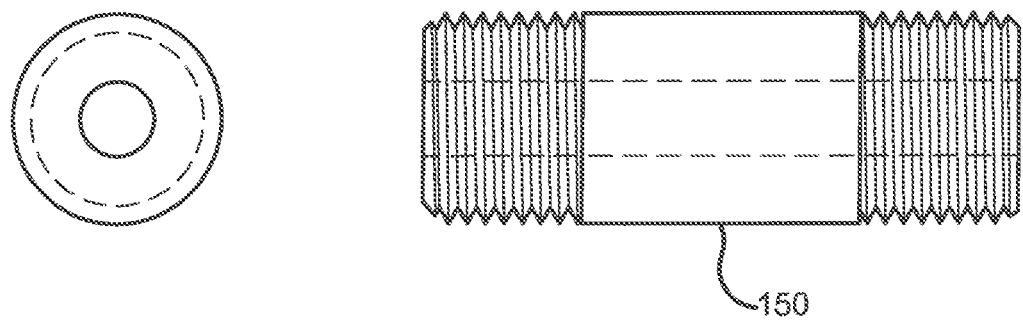
FIG. 16 is a cross-sectional side view of a non-limiting first embodiment of an exemplary flow control valve.

With continuing reference to FIGS. 15 and 16, conduit referred to as a flow control nipple (150) may be engaged with the bypass hole (122) of the coolant adapter plate (118). The flow control nipple (150) may be manufactured from any materials within the sound judgment of those of skill in the art. In certain embodiments, the flow control nipple (150) is manufactured from brass (e.g., machined brass) and may include threads on both ends. The flow control nipple (150) may be of any size suitable to reduce the flow of water as it passes through the bypass hole (122). In certain embodiments, the flow control nipple has an outer diameter of approximately 0.535 inches, an inner diameter of 11/64 inches and has a thread on both ends of ¼×18 National Pipe Thread (NPT). The flow control nipple (150) in combination with the pressure regulator (110) function to maintain an internal working pressure of about 10 PSI and a flow rate of about 2 gallons per minute within the engine cooling system. In certain embodiments, the flow control nipple (150) and pressure regulator (110) can be utilized to maintain a constant water flow and pressure despite variations in flow and pressure from the water source. This can be advantageous in certain situations when, for example, well water is used as the water source, wherein pressure variations may range from between about 25 to about 90 PSI. In 30 kilowatt generator units, for example, the an 11/64 inch sized flow control nipple and pressure regulator can allow the engine to operate between about 100 degrees Fahrenheit at no load at a maximum of about 145 degrees at heavy loads (these values may be varied depending on the size or capacity of the particular generator being used). Running the engine at these temperatures provides considerable safety for occupants of a home or building in that anyone who may inadvertently touch the engine (in particular a child) would not suffer a burn. Also, removing moving parts such as the water pump, alternator, belts, fan and all of the associated belts provides additional safety as it is no longer possible for individuals to get a hand or limb caught in those components of the engine.

Figure 17:
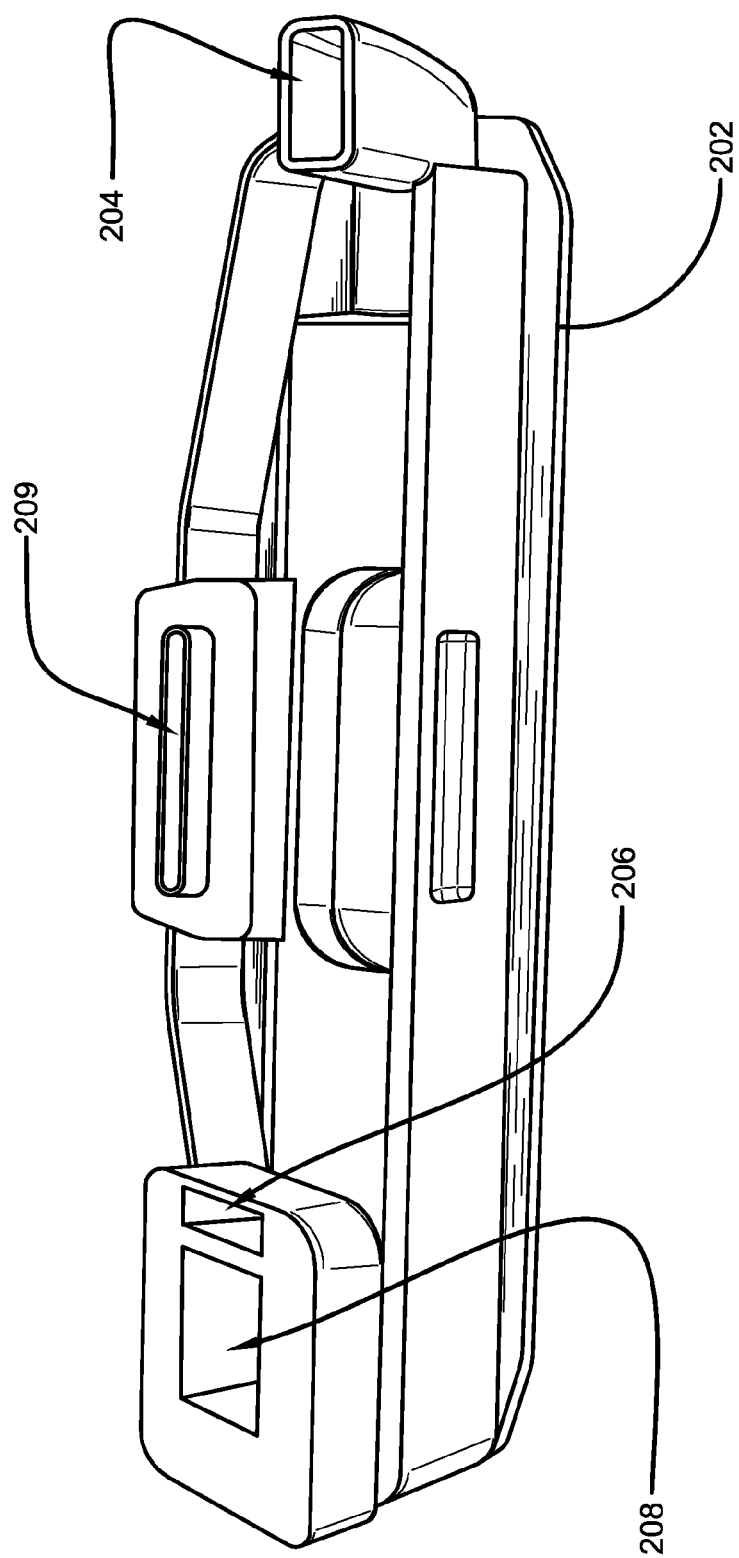
FIG. 17 is a perspective view of a non-limiting first embodiment of a wet exhaust manifold.
Figure 18:
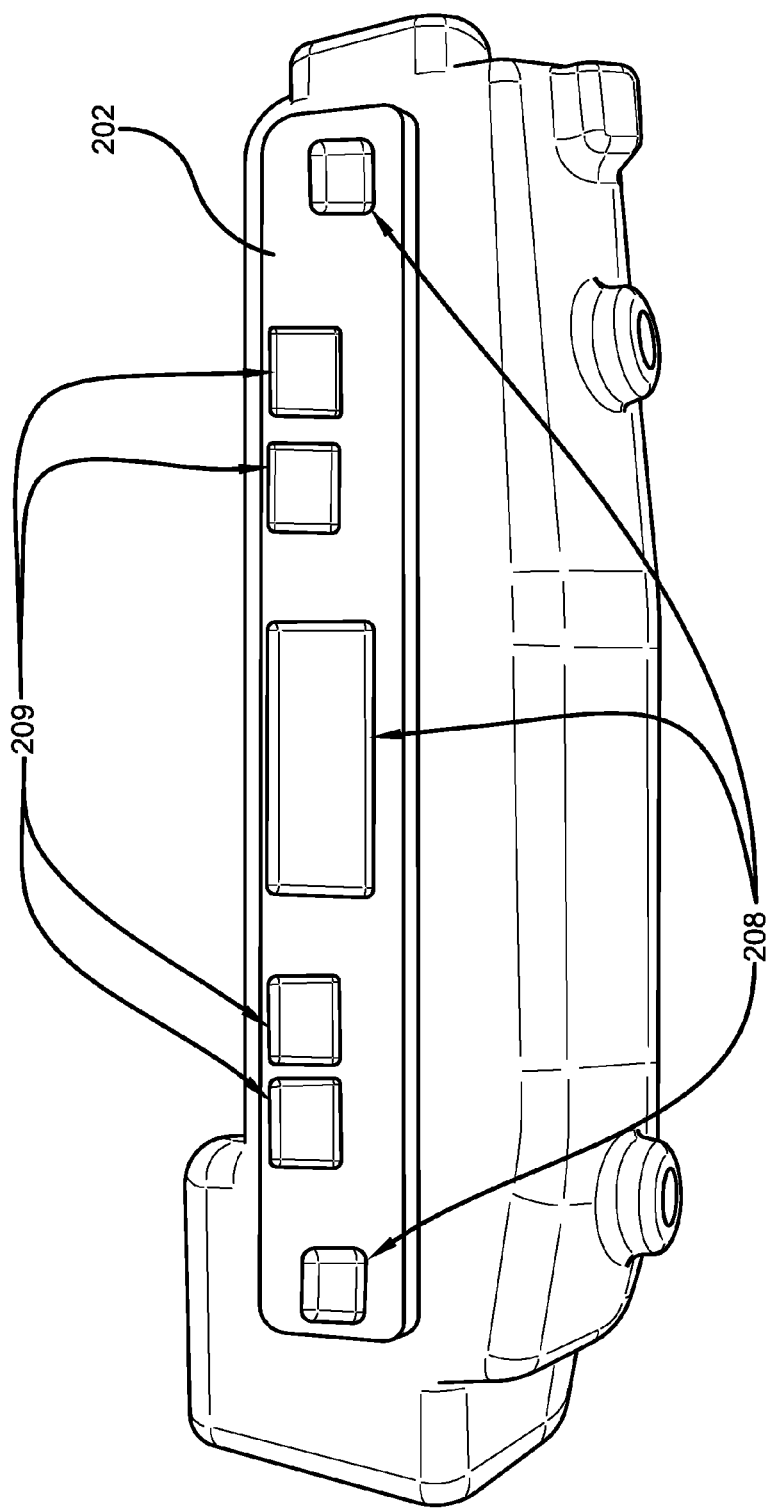
FIG. 18 is a perspective view of a non-limiting first embodiment of a wet exhaust manifold.

Another advantageous feature of the present generator (10) is the exhaust system (200). With reference to FIGS. 17 and 18, the exhaust system (200) includes a wet exhaust manifold (202). As mentioned above, the wet exhaust system (200) includes passageways for receiving water from the coolant system (100) which can be passed along to exit the engine (20). These passageways or water channels are illustrated within the right and left side portions of the wet exhaust manifold (202) within FIG. 17. As illustrated within FIG. 17, water enters the wet exhaust manifold (202) at the water channel entry (204) at the right side portion of the exhaust manifold (202) and exits the wet exhaust manifold (202) at the water channel exit (206) at the left side portion of the exhaust manifold (202). As further illustrated at the left side portion of the wet exhaust manifold (202) of FIG. 17, the water channels surround an exhaust channel (208). By surrounding the exhaust channel (208) within the wet exhaust manifold (202), the water channels (204) allow the surface of the exhaust manifold to remain cool. Accordingly, in certain embodiments, the surface of the exhaust manifold does not exceed a maximum of 145 degrees Fahrenheit. At these temperatures, anyone who may inadvertently touch the wet exhaust manifold (202) would not be burned. These temperatures are also low enough to prevent combustion of the home or building structure as exhaust exits the engine.

The wet exhaust manifold (202) described above also functions as an intake manifold as it contains a fuel entry port (209) within its center portion which receives fuel (e.g., natural gas) from the carburetor (18). FIG. 18 illustrates the fuel entry ports (209) within a typical wet exhaust manifold (202). In the present embodiment, the wet exhaust manifold includes four fuel entry ports within the center portion of the wet exhaust manifold (202) although any practical number of fuel entry ports may be included at any practical position within the wet exhaust manifold (202) within the sound judgment of those of skill in the art. FIG. 18 further illustrates the exhaust gas ports (208) within a typical wet exhaust manifold (202). In the present embodiment, the wet exhaust manifold (202) includes three exhaust gas ports at the left side portion, right side portion and center portion of the wet exhaust manifold (202) although any practical number of exhaust gas ports may be included at any practical position within the wet exhaust manifold within the sound judgment of those of skill in the art.

Figure 21D:
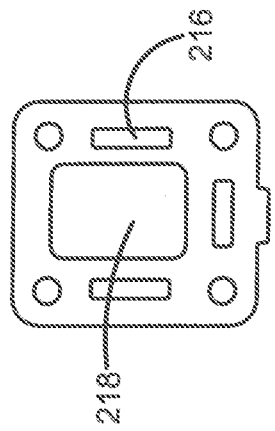
Figure 21E:
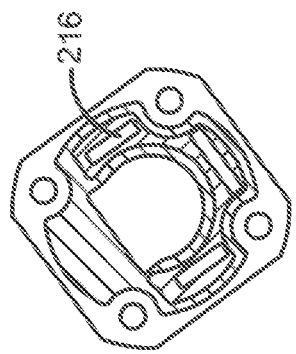
Figure 21A:
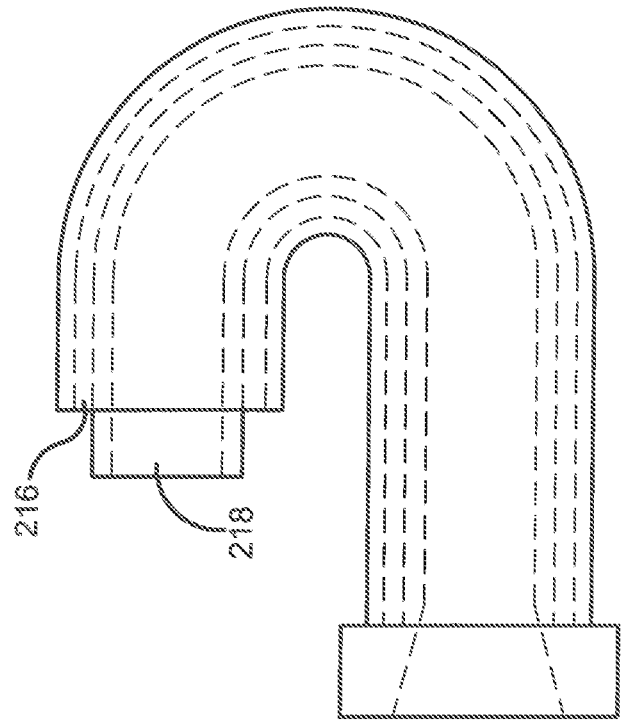
Figure 21C:
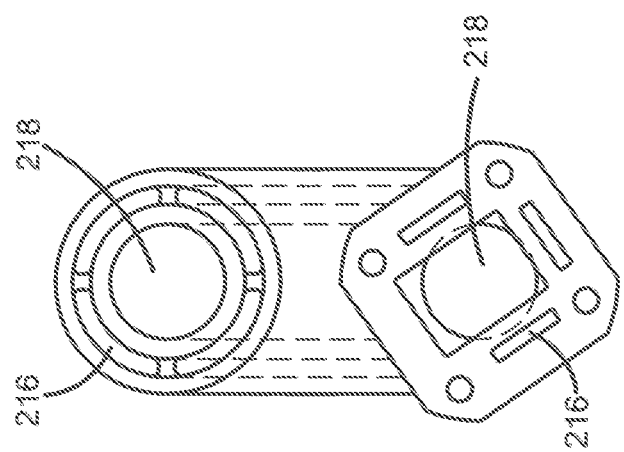

FIG. 19 illustrates an exemplary wet exhaust manifold (202) installed onto an engine (20). The wet exhaust manifold (202) includes a carburetor (18) installed on its top center surface, a water entry conduit (212) connected to the water channel entry (204) at the manifold's left side portion and an exhaust riser (214) connected or bolted onto the water channel exit (206) and the exhaust channel (208) at the manifold's right side portion. The exhaust riser may be manufactured from any material and may be formed in any shape within the sound judgment of those of skill in the art. In certain embodiments, the exhaust riser (214) is manufactured from an iron casting. An exemplary exhaust riser (214) is further illustrated within FIGS. 20 and 21a through 21e. As shown within FIGS. 21a through 21e, the exhaust riser (214), in certain embodiments, is double walled to include water channels (216) which circumferentially surround the interior exhaust passageway (218) through the center of the exhaust riser (214) through which exhaust gases pass through. These water channels (216) maintain the temperature of the exhaust gases cool as the exhaust mixes with the cooling water and exits the riser. In certain embodiments, exhaust gas passing through the exhaust riser (214) is kept at temperatures similar to those of the wet exhaust manifold (202). According to FIG. 21b, the bottom surface of the exhaust riser (214) which connects to the wet exhaust manifold (202) may, in certain embodiments, include fluted sides to allow for bolt clearance along four corners of the bottom surface. FIG. 21c illustrates an exemplary gasket for the exhaust riser (214). FIG. 21d illustrates an exemplary bottom surface of an exemplary exhaust riser (214) which connects to the wet exhaust manifold (202). FIG. 21e is a planar illustration of an exemplary double walled casting that runs through the length of the exhaust riser (214).

At the terminal point of the exhaust riser (214), exhaust gases are allowed to mix with the cooling water as the exhaust gases and cooling water enter a first exhaust riser conduit (220). The first exhaust riser conduit (220) may be formed into any shape and from any material within the sound judgment of those of ordinary skill in the art. In certain embodiments, the exhaust riser conduit (220) is bent at two points in order to allow exhaust gas to travel to a marine muffler (222) and is fabricated from a polymeric material or plumbing material (e.g., standard polyvinyl chloride plumbing materials). In further embodiments, the first exhaust riser conduit (220) allows exhaust gases to travel outside the electric generator casing and into the marine muffler (222). In yet further embodiments, first exhaust riser conduit (220) is connected to a second exhaust riser conduit (224) which is connected to a third exhaust gas riser conduit (226) which is connected to the marine muffler (222). In should be understand that any number of conduits may connect the exhaust gas riser (214) to the marine muffler (222) and that any type of clamp within the sound judgment of those of skill in the art may be used to connect the first exhaust gas riser conduit (220) to the exhaust riser (214), the second exhaust gas riser conduit (224) to the first exhaust gas riser conduit (220), the third exhaust gas riser conduit (226) to the second exhaust gas riser conduit (224) and the third exhaust gas riser conduit (226) to the marine muffler (222).

An exemplary marine muffler which may be utilized with the electric generator (20) is illustrated within FIG. 22. In certain embodiments, the marine muffler may be sound insulated. In certain embodiments, a suitable marine muffler which may be utilized with the electric generator is a Combo-Sep™ marine muffler offered by Centek Industries (Thomasville, Ga.). The marine muffler separates the exhaust gas and water mixture and contains passages which allows water to be sent down a drain pipe and clean exhaust fumes to be sent outside the home. In certain embodiments, water exits the marine muffler (222) at approximately 2 gallons per minute. Use of a marine muffler also has an effect in allowing the electric generator to operate in a relatively quiet manner within the home or building.

Another advantageous feature of the present generator (10) is the insulation system (300). Current generators on the market are very noisy. Accordingly, for a generator to be practical for indoor use, a significant amount of noise reduction must be obtained. The present generator obtains significant noise reduction by enclosing the generator within a casing. With reference to FIGS. 23a and 23b, the generator casing includes a front panel (302), a back panel (304), at least two side panels (306) and a first top panel (308) and a second top panel (310). In certain embodiments, the casing includes four side panels (306). In certain embodiments, each of the panels may be made from fiberboard. In further embodiments, the each of the panels may be made from a ¾ inch medium density fiberboard which weighs approximately 4.5 pounds per square foot. This material may act as a very effective sound absorber. In certain embodiments, the panels are attached to a structural frame (312) which houses the electric generator (10). The panels may be attached to the structural frame (312) in any manner within the sound judgment of those of skill in the art. In certain embodiments, the front panel (302) and the back panel (304) are bolted onto a structural frame (312) which houses the electric generator (10). In further embodiments, the front panel (302) and the back panel (304) may utilize one or two bolts at each corner of the top and bottom portions of the panel to secure the panel to the structural frame (312). The front panel (302) may also include two cutouts along its bottom portion to allow a water inlet (104) and a fuel or natural gas inlet (30) to pass through the casing to the electric generator. The back panel (304) may also include two cutouts (316) along its bottom portion at least one of which allows various electrical circuits to pass from the electric generator (10) through the casing. The side panels (306) may be attached to the structural frame (312) by any means (e.g., any type of faster) within the sound judgment of those of skill in the art (e.g., bolts). In certain embodiments, the side panels (306) are secured to the structural frame by a Velcro attachment along at least one of the top or bottom interior surface of the panels. In certain embodiments, at least one side panel may have a cutout of a suitable size to allow the exhaust riser (214) and/or associated exhaust conduits to pass through the casing to the marine muffler (222). In yet further embodiments, two side panels on opposing sides may have cutouts of a suitable size to allow the exhaust riser (214) and/or associated exhaust conduits to pass through the casing to the marine muffler (222) on either side of the electric generator as needed, with the non-used side having a covering over the cutout.

In further embodiments, the insulation system (300) may further include a sound barrier material which lines the inner surface of the panels of the casing. An exemplary sound barrier material which may be utilized in the present insulation system (300) may consist of a one inch open cell foam layer, a first ⅛ inch thick lead loaded vinyl sheet, a first ½ inch foam layer a second ⅛ inch thick lead loaded vinyl sheet and a second ½ inch foam layer. In certain embodiments, this sound barrier material is flame proof under Underwriters Laboratories (UL) 94 listing. In certain embodiments, a suitable sound barrier material which may be utilized with the casing is Polydamp® Acoustical Barrier from Polymer Technologies, Inc. (Newark, Del.).

Figure 3:
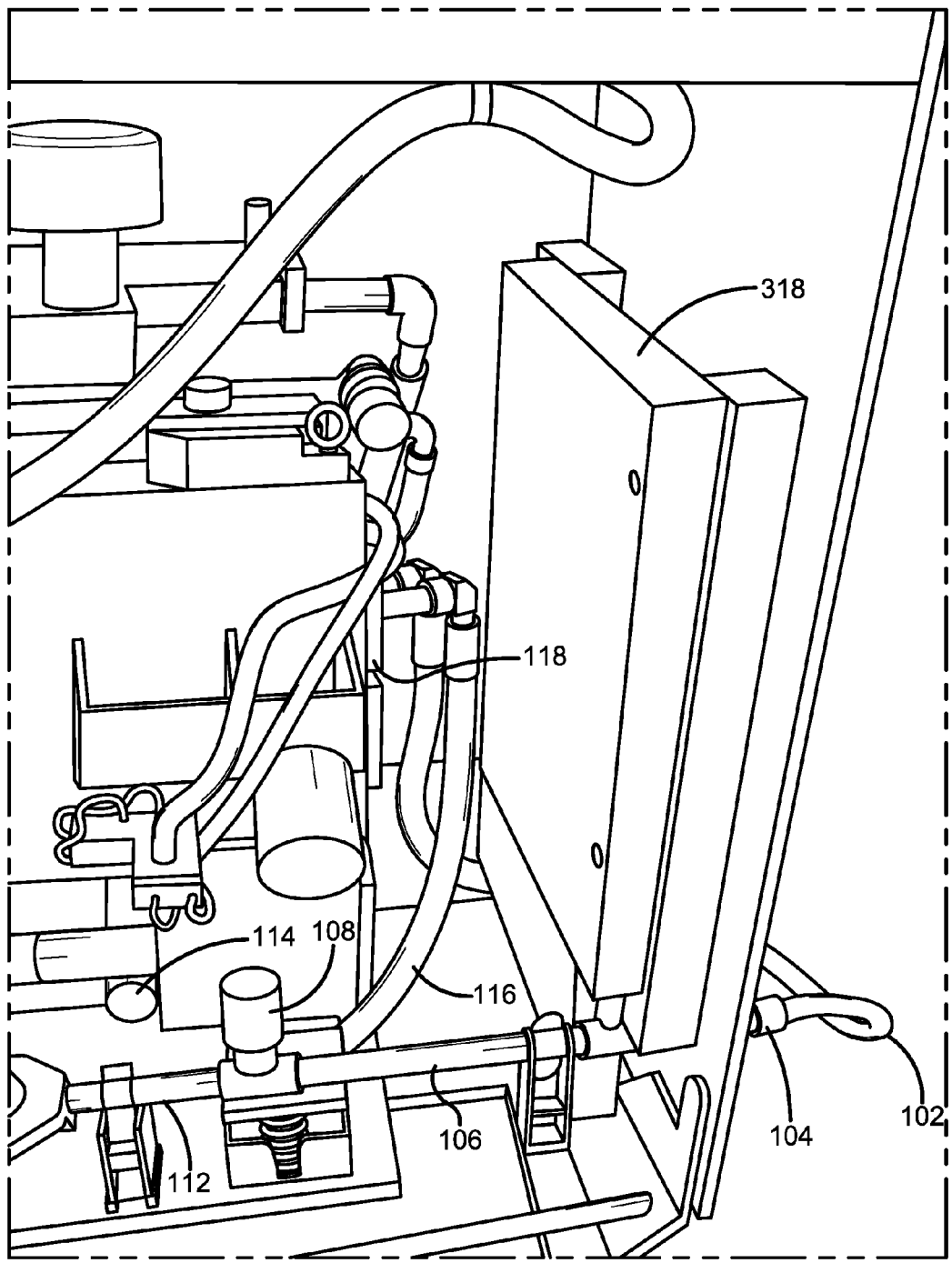
FIG. 3 is a side view of the front portion of the non-limiting first embodiment of an electric generator.
Figure 4:
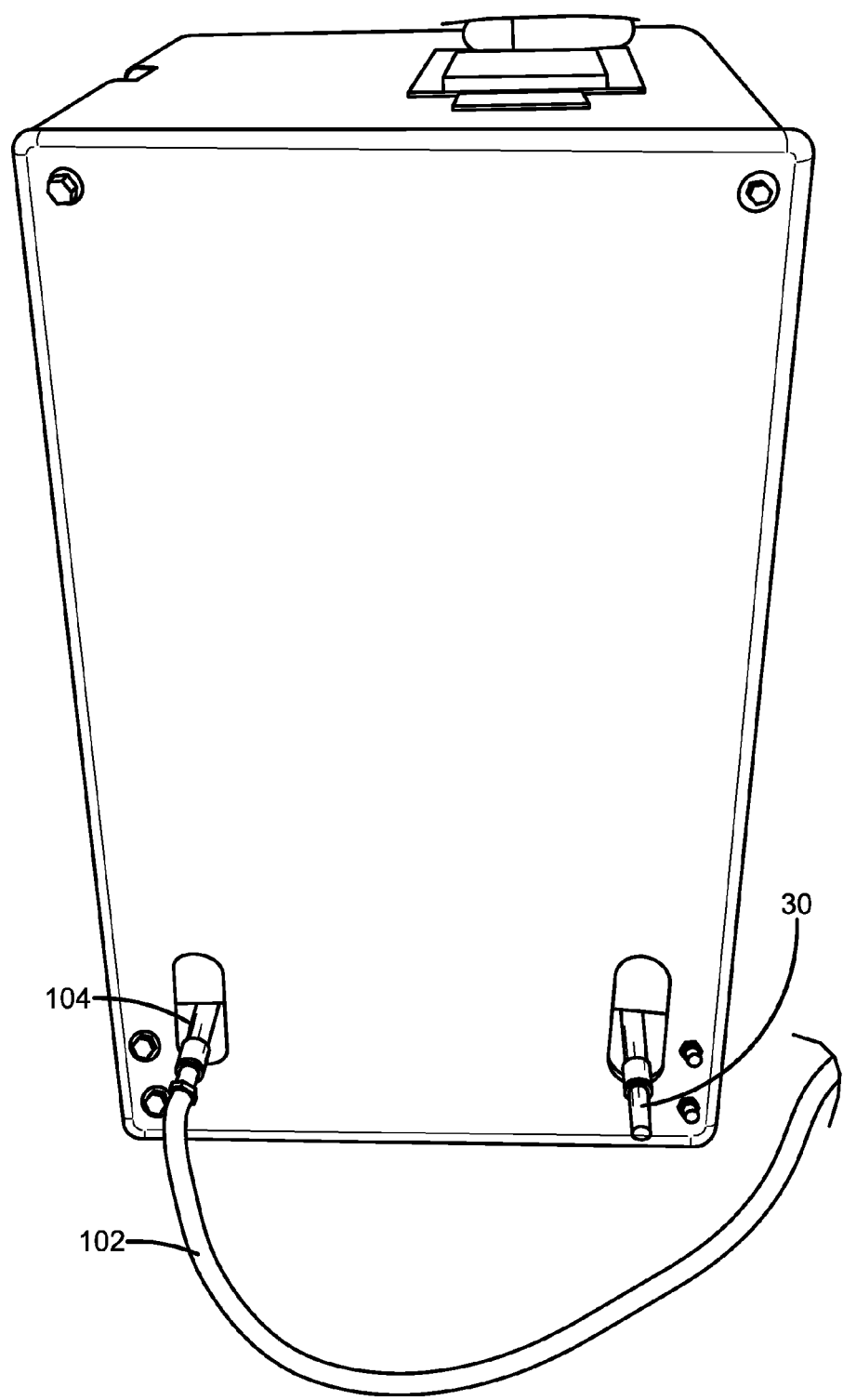
FIG. 4 is a front view of the non-limiting first embodiment of an electric generator positioned behind a front panel.
Figure 5:
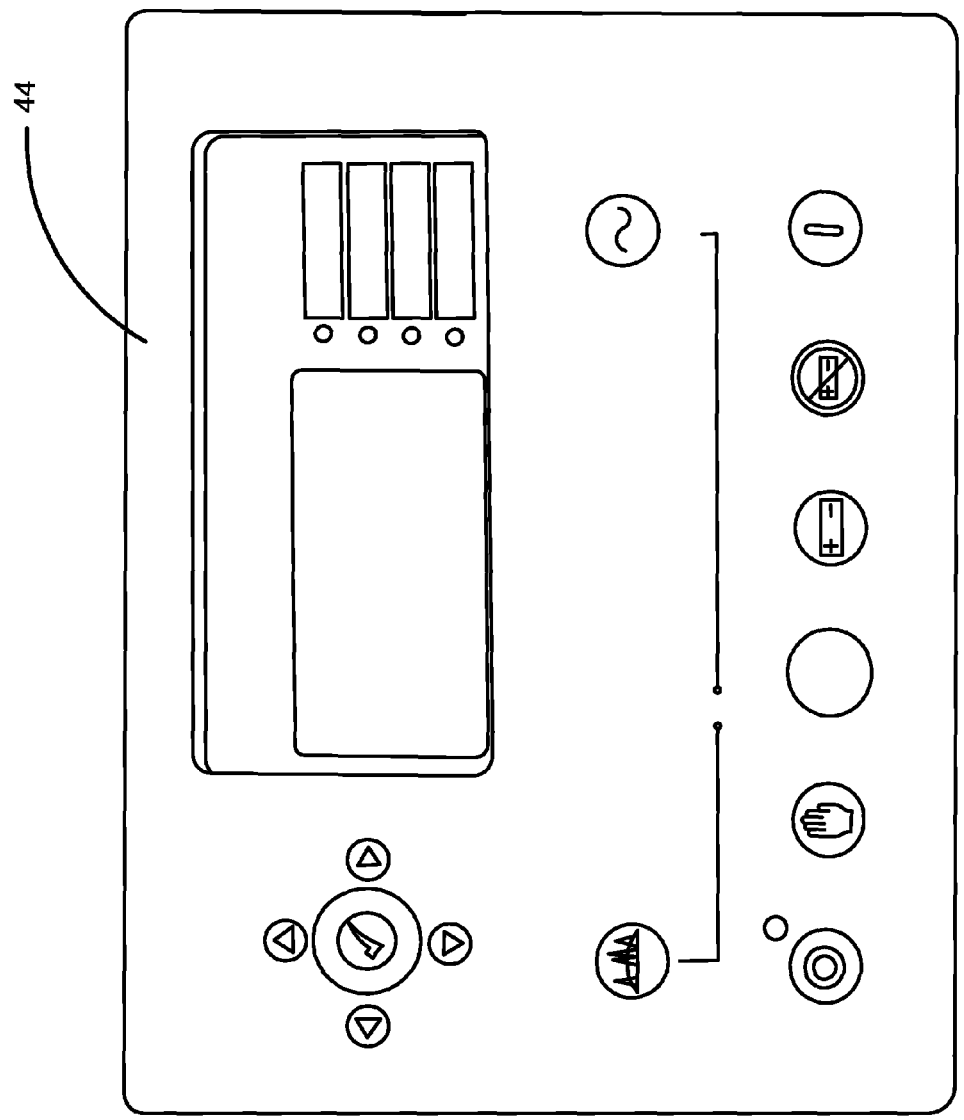
FIG. 5 is a view of a non-limiting first embodiment of a controller.

With reference to FIG. 3, the sound barrier material may, in certain embodiments, form a plenum (318) at the front panel (302) and the back panel (304) of the casing at the front and back portions of the generator (10). In certain embodiments, a flow of air may be needed to further cool the generator (10) as it is operating within the casing. Air flow requirements may vary depending on the type of generator and casing utilized. In certain embodiments, approximately 190 cubic feet per minute of air flow is required to feed the carburetor intake plus additional air to cool the alternator (30). This air flow requirement can be met through the use of two plenums (318) at the front panel (302) and the back panel (304) of the generator (10). In certain embodiments, air may flow in from the bottom portion of the plenum at the front panel (302) and move upwards towards the top opening of the plenum. As air exits the top opening of the plenum it passes over the top surface of the engine (20) across the generator (10) and enters the top portion of the plenum at the back panel (304). Air then passes through the alternator, down and out the plenum at the back panel (304) and exits the casing through an opening at the bottom of the back panel (304) plenum and casing. The flow of air is driven by a vacuum created by the spinning of the rotor within the alternator (30).

A further advantage of the present generator (10) is its portability. A typical 30 kW generator that is fully assembled can weigh up to 1,200 pounds. Moving such a generator through doorways, around corners, down staircases and through hallways can be near impossible. Accordingly, the present disclosure provides a generator (10) that can be quickly and easily disassembled and re-assembled. In certain embodiments, this can be accomplished through the use of an alternator mounting rail (400), an engine mounting rail (420) and mounting rail connector illustrated within FIG. 25. The alternator mounting rail (400) and engine mounting rail (420) may include various rails (402) and cross members (404) which function as a structural support to hold the alternator (30) and engine (20). The mounting rail connector functions to connect the engine mounting rail (420) to the alternator mounting rail (400). In certain embodiments, the engine mounting rail (420) and alternator mounting rail (400) may fittingly engage with each other in an overlapping manner before the mounting rail connector (400) is fitted over the overlapping section of the engine and alternator mounting rails (420 and 400) at a joint (not shown). These mounting rails may be easily connected or disconnected as needed through the use of various fasteners (e.g., nuts and bolts). The engine and alternator mounting rails may also be designed to temporarily be connected to castor wheels which allow for easy movement of the engine and alternator to the desired location. In certain embodiments, various mounts and/or struts (e.g., flex struts (406)) may be positioned on the engine and/or alternator mounting rails support the engine and/or alternator as illustrated within FIG. 24. The present design allows the generator (10) to be delivered in parts and assembled in less than one day.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. An apparatus comprising:
a cooling system which allows for indoor operation of an electric generator and associated engine, the cooling system comprising:
a water-source conduit which allows water to flow from a source of water to a water inlet and at least one associated conduit within the electric generator;
a pressure regulator connected to the at least one conduit for reducing the pressure of the water as it flows through the at least one associated conduit;
an adapter plate engaged to the generator engine which receives the at least one associated conduit at a main hole water entry point; and
a flow control nipple engaged to a bypass valve on the adapter plate which reduces the flow of water as it passes from the engine through the bypass valve, wherein the bypass valve allows water to bypass a thermostat and circulate through the engine before the water heats up to open the thermostat thereby allowing the engine to cool immediately after an initial start-up;
wherein the water flows through at least one associated conduit into a wet exhaust manifold as it exits the bypass valve and wherein heated water flows through at least one associated conduit into the wet exhaust manifold as it exits the opened thermostat.

2. The apparatus of claim 1, wherein the water flow through the water inlet and the at least one associated conduit is controlled by a solenoid which receives an input from a controller to open or close the flow of water depending on the cooling needs of the engine.

3. The apparatus of claim 1, wherein the cooling system does not comprise a drive-belt system.

4. The apparatus of claim 3, wherein the cooling system does not include a water pump, an alternator and associated belts.

5. The apparatus of claim 4, wherein the cooling system does not include a radiator and cooling fans.

6. The apparatus of claim 5, wherein operation of the pressure regulator and flow control nipple prevents overcooling of the engine.

7. The apparatus of claim 6, wherein the pressure regulator reduces the pressure of water flow to about 10 psi.

8. The apparatus of claim 7, wherein the flow control nipple reduces the flow of water throughout the cooling system to about 2 gallons per minute.

9. The apparatus of claim 7, wherein a water pressure gauge is connected to the at least one associated conduit.

10. The apparatus of claim 1, wherein the flow control nipple is brass and comprises a first threaded end and a second threaded end.

11. The apparatus of claim 8, wherein the flow control nipple has an outer diameter of approximately 0.535 inches and an inner diameter of $^{11}/_{64}$ inches.

12. The apparatus of claim 8, wherein the flow control nipple and pressure regulator work in conjunction to maintain a constant flow of water and a constant pressure despite variations in flow and pressure from the water source.

13. The apparatus of claim 1, wherein the flow control nipple and pressure regulator allows the engine to operate between about 100 degrees Fahrenheit at no load and at a maximum of about 145 degrees Fahrenheit at an applied load.

14. The apparatus of claim 1, wherein the wet exhaust manifold comprises a water inlet for receiving water from the engine, a water outlet, at least one fuel entry port, at least one exhaust gas inlet for receiving exhaust gas from a combustion chamber and an exhaust gas outlet, wherein the water outlet circumferentially surrounds the exhaust gas outlet to provide a cooling effect on the exhaust gases.

15. The apparatus of claim 14, wherein an exhaust riser is engaged to the exhaust gas outlet and water outlet of the wet exhaust manifold, wherein the exhaust riser includes water channels circumferentially surrounding an exhaust channel to provide a cooling effect on the exhaust gases as exhaust gases and water pass through the riser.

16. The apparatus of claim 15, wherein at least one exhaust riser conduit is engaged to the exhaust riser, wherein the exhaust riser conduit allows for further passage of a mixture of exhaust gases and water from the riser.

17. The apparatus of claim 16, wherein the exhaust riser conduit allows cooling water to mix with the exhaust gases.

18. The apparatus of claim 17, wherein a marine muffler is engaged to the exhaust riser conduit which connects the marine muffler to the exhaust riser, wherein the marine muffler allows for separation of exhaust gases from water received from the exhaust riser and wherein the marine muffler dispenses exhaust gases through a stack and cooling system water down a drain.

* * * * *

UNITED STATES PATENT AND TRADEMARK OFFICE
CERTIFICATE OF CORRECTION

| | |
|---|---|
| PATENT NO. | : 9,705,381 B2 |
| APPLICATION NO. | : 14/848727 |
| DATED | : July 11, 2017 |
| INVENTOR(S) | : Julious M. Menefee and Bruce Bechhold |

It is certified that error appears in the above-identified patent and that said Letters Patent is hereby corrected as shown below:

On the Title Page

In item (73) Assignee, delete "Origin, LLC" and insert --Origen LLC--.

Signed and Sealed this
Seventeenth Day of March, 2020

Andrei Iancu
*Director of the United States Patent and Trademark Office*